United States Patent [19]

Ozden et al.

[11] Patent Number: 5,761,692
[45] Date of Patent: Jun. 2, 1998

[54] METHOD AND APPARATUS OF RETRIEVING CONTINUOUS AND NON-CONTINUOUS MEDIA DATA FROM A FILE SYSTEM

[75] Inventors: Banu Ozden, Summit; Rajeev Rastogi, New Providence; Abraham Silberschatz, Summit, all of N.J.

[73] Assignee: Lucent Technologies Inc., Murray Hill, N.J.

[21] Appl. No.: 441,566

[22] Filed: May 15, 1995

Related U.S. Application Data

[63] Continuation-in-part of Ser. No. 341,827, Nov. 18, 1994, Pat. No. 5,708,796.

[51] Int. Cl.$^6$ .................................................. G06F 17/30
[52] U.S. Cl. ........................ 711/4; 711/114; 395/673; 707/205
[58] Field of Search .................................. 395/614, 621, 395/425, 673; 386/69; 364/514 A; 711/4, 114; 707/205

[56] References Cited

U.S. PATENT DOCUMENTS

| | | | |
|---|---|---|---|
| 5,416,914 | 5/1995 | Korngiebel et al. | 395/425 |
| 5,528,513 | 6/1996 | Vaitzblit et al. | 364/514 A |
| 5,613,032 | 3/1997 | Cruz et al. | 386/69 |

OTHER PUBLICATIONS

P. Venkat Rangan and Harrick M. Vin, "Designing File Systems for Digital Video and Audio", ACM pp. 81–94, 1991.

David P. Anderson, "A File System for Continuous Media", ACM Transactions Computer Systems, vol. 10, No. 4, pp. 311–337, Nov. 1992.

Ryu et al., "A Dynamic Buffer Management Technique for Minimizing the Necessary Buffer Space in a Continuous Media server", IEEE, Jan. 1996.

R. Wang and A. Karmouch, "A Multimedia File Structure for Continuous and Discrete Media", IEEE, Sep. 1993.

Anderson, D.P., et al., "A File System for Continuous Media," ACM Transactions on Computer Systems, vol. 10, No. 4, Nov. 1992, pp. 311–337.

Chen, M.S., et al., "Optimization of the grouped sweeping scheduling (gss) With Heterogeneous Multimedia Streams," Proceedings of the ACM International Conference on Multimedia, 1993, pp. 235–242.

(List continued on next page.)

*Primary Examiner*—Thomas G. Black
*Assistant Examiner*—Cheryl R. Lewis

[57] ABSTRACT

Retrieval of both continuous and non-continuous media data is performed concurrently for multiple requests, where servicing of continuous media data requests at varying rate requirements is guaranteed within a common retrieval period. The common period is selected with respect to the available buffer space and the total disk retrieval times required for servicing multiple requests. Servicing of requests is re-commenced immediately after all admitted requests have been serviced, regardless if the common period has elapsed. High throughput is obtained and transfer rates for a large number of real-time requests are guaranteed by reducing seek latency and eliminating rotational latency so that the buffering requirements for requests are reduced. Disk scheduling techniques are applied for disks having transfer rates which vary from one track to another. Non-continuous media requests are serviced concurrently with continuous media requests by reserving a certain portion of the disk bandwidth for non-continuous media requests in order to provide for low response times. Changing workloads are accommodated by dynamically varying the buffer space allocated to continuous media and non-continuous media requests and by using the time allocated but not utilized for continuous media requests for servicing non-continuous media requests. The disk scheduling techniques are also applicable for disks having varying track sizes and where clips are stored on tracks non-contiguously.

52 Claims, 6 Drawing Sheets

OTHER PUBLICATIONS

Gemmell, J., and Christodoulakis, S., "Principles of Delay-Sensitive Multimedia Data Storage and Retrieval." ACM Transactions on Information Systems, vol. 10, No. 1, Jan. 1992, pp. 51–90.

Rangan, P.V., and Vin, H.M., "Designing File Systems for Digital Video and Audio," Proceedings of the Thirteen Symposium on Operating System Principles, 1991, pp. 81–94.

Reddy, A.L.N., and Wyllie, J.C., "I/O Issues in a Multimedia System," Computer, vol. 27, No. 3, Mar. 1994, pp. 67–74.

METHOD AND APPARATUS OF RETRIEVING CONTINUOUS AND NON-CONTINUOUS MEDIA DATA FROM A FILE SYSTEM

This application is a continuation-in-part of "Method and Apparatus of Retrieving Continuous and Non-Continuous Media Data From a File System", Ser. No. 08/341,827, filed Nov. 18, 1994 now U.S. Pat. No. 5,708,796.

FIELD OF THE INVENTION

The present invention relates to scheduling data retrieval from a multimedia file system, and more particularly, to scheduling the retrieval of continuous and non-continuous media data streams from a multimedia file system.

BACKGROUND OF THE INVENTION

Systems which facilitate the retrieval of multimedia data files are becoming more popular. These systems, such as personal computers, workstations and other types of multimedia devices, can be used to provide multimedia services such as multimedia electronic mail, news, lectures, hypermedia documents, and movies on demand.

Multimedia data typically includes continuous media data such as digital audio, animation and video data. Continuous media data are sensitive to delay in that successive units of data must be presented or transferred to a requesting client within a real-time deadline in order for the data to be correctly reproduced. For example, digital audio samples must be delivered to a digital-to-analog converter at a precise transfer rate in order to properly reproduce the represented sounds. Likewise, if video and animation data are not delivered at the precise rate, image motion tends to be interrupted and not flow smoothly.

Multimedia systems typically include servers, disks and buffers which operate to provide data for servicing multiple requests concurrently. Disk scheduling procedures determine whether a server in such a system can retrieve data from a disk to a buffer for adequately servicing a particular multimedia request. Adequate servicing of requests includes considerations such as the ability to guarantee the rate at which a datastream can be transmitted and the ability to interleave non-continuous data transmission with continuous data transmission. In addition, a server must be capable of concurrently retrieving different data files for different clients, regardless of whether the files are continuous or non-continuous data files.

Conventional disk scheduling procedures which are presently utilized in multimedia systems cannot guarantee that a given transfer rate can be maintained for servicing a continuous media request, in other words, that data can be retrieved from disk and made available for servicing a continuous media request in real-time. Further, multimedia systems typically include only a limited amount of buffer space. As continuous media data tends to be voluminous, many continuous media data requests cannot be adequately serviced by such systems.

A need, therefore, exists for a multimedia file system which ensures that once a continuous media request is accepted, the data is made available for transfer at a guaranteed rate. The system should also be able to service concurrently multiple continuous media requests having different rates and multiple non-continuous media data requests.

SUMMARY OF THE INVENTION

In accordance with the present invention, methods and apparatus are provided for retrieving data from disk to ensure that continuous media data requests are serviced at the required transfer rates and facilitate the concurrent servicing of non-continuous media data requests with continuous media data file requests.

In one embodiment of the present invention, a multimedia file system comprises at least one server connected to a plurality of terminals via a network, a line and a switch. The server includes a processor, a disk reader, disks containing the requested data files and buffers for temporary data storage. The server receives requests for the retrieval of continuous and non-continuous media data from the terminals.

The server establishes a common retrieval period for servicing each admitted request during a service cycle. For all of the disk scheduling processes provided for by the present invention, retrieval of data for servicing admitted requests recommences once all requests have been serviced in the service cycle, even though the common period has not expired.

In one aspect of the invention, a disk scheduling process called early response (ER) for immediately servicing newly received requests is implemented using the common retrieval period interval. ER provides that servicing of requests admitted in a previous cycle and not yet serviced during the current cycle is postponed until after requests admitted in a current service cycle are serviced.

In an alternative aspect of the present invention, a disk scheduling process called C-LOOK is implemented. C-LOOK minimizes seek time during data retrievals in the course of a common period by optimizing movement of a disk arm of a disk reader over a disk.

In another aspect of the invention, the disk scheduling techniques of ER and C-LOOK are implemented so as to minimize or eliminate rotational latency as a time component for retrieving data from disk.

In a further aspect of the invention, the duration of the common period may be dynamically varied during servicing of requests in order to optimize the use of buffer space and disk bandwidth.

In another aspect of the present invention, the above techniques of ER, C-LOOK and reducing or eliminating rotational latency may be modified to account for variation in disk transfer rates on disks and non-contiguous storage of continuous media data on disk.

Additional features and advantages of the present invention will become readily apparent to those of ordinary skill in the art by reference to the following detailed description and accompanying drawings.

DETAILED DESCRIPTION

Figure 1:
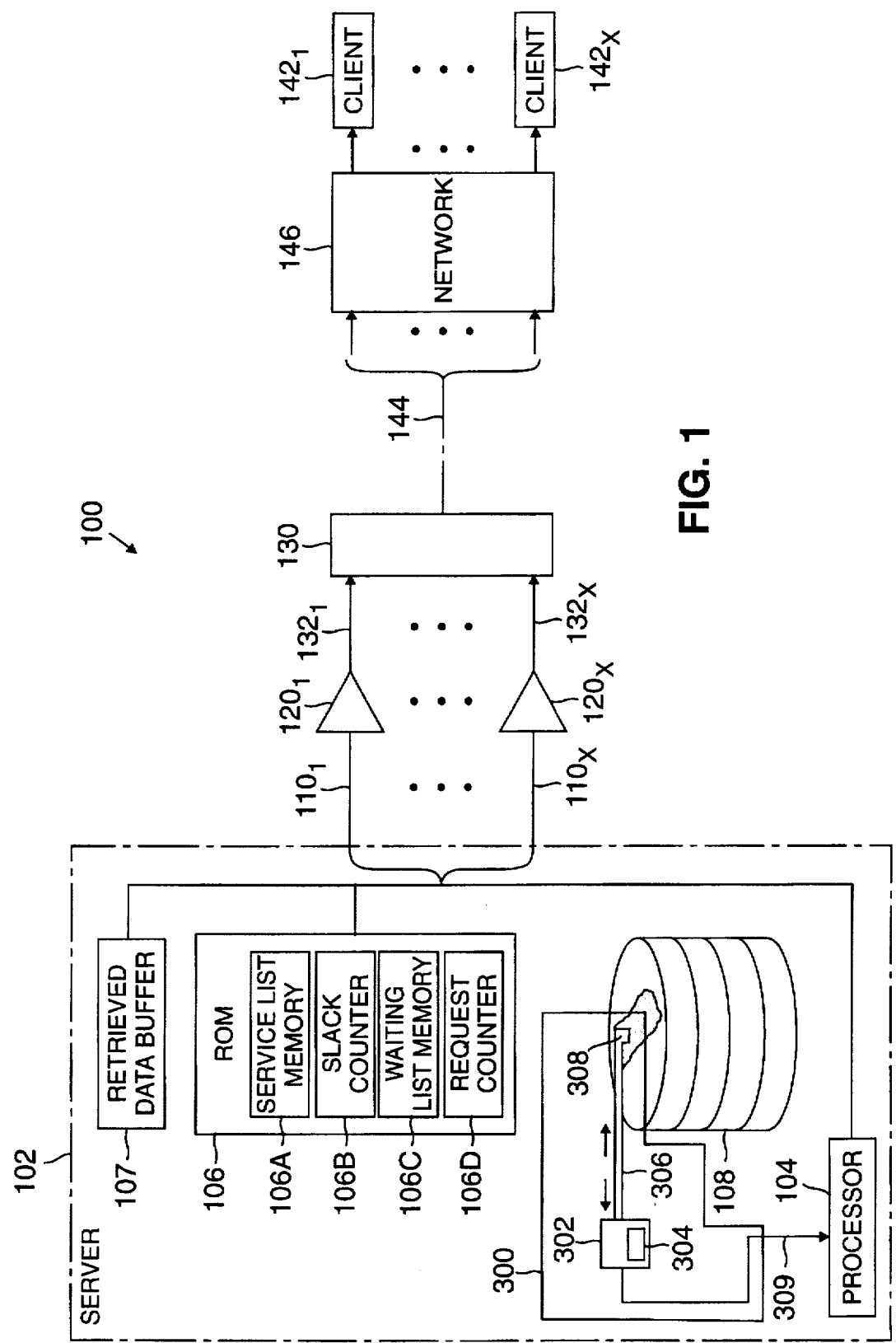
FIG. 1 illustrates a block diagram of an architecture of a multimedia file system for retrieving continuous and non-continuous data files in accordance with the present invention.

FIG. 1 shows an exemplary architecture of a multimedia data file system 100 which provides for the retrieval of continuous and non-continuous media data files in accordance with the present invention. The system 100 includes a server 102 which may be a personal computer or work station. The server 102 suitably comprises a standard processor 104 that is connected to a read only memory (ROM) 106, a retrieved data buffer 107 and one or more random access memory (RAM) disks 108. The RAM disks 108 provide for storage of continuous media data files, such as, for example, digital audio, animation or video data files, and non-continuous data files, such as document files. The RAM disks 108, the ROM 106 and the buffer 107 are suitably connected to RAM buffers $120_{1,2...x}$ by transmission lines $110_{1,2...x}$, respectively.

The outputs of the RAM buffers $120_{1,2...x}$ are linked to a standard switch 130 by lines $132_{1,2...x}$, respectively. The output of the switch 130 may be selectively linked to one of clients $142_{1,2...x}$ via a transmission line 144 and a network 146. The client may be a terminal, personal computer, workstation or any other type of device capable of receiving continuous and non-continuous data. The network 146 may be any type of network, such as, for example, a wide area network (WAN) or a local area network (LAN), which suitably connects a plurality of clients to a server. It is to be understood that additional transmission lines may be connected to the server 102 for servicing an increased number of clients. Data such as client requests and billing information are transmitted between the server 102 and clients using conventional techniques, such as over a coaxial cable, an optical fiber telephone line or Ethernet, not shown, which connects the server 102 to the network 146.

Figure 2:
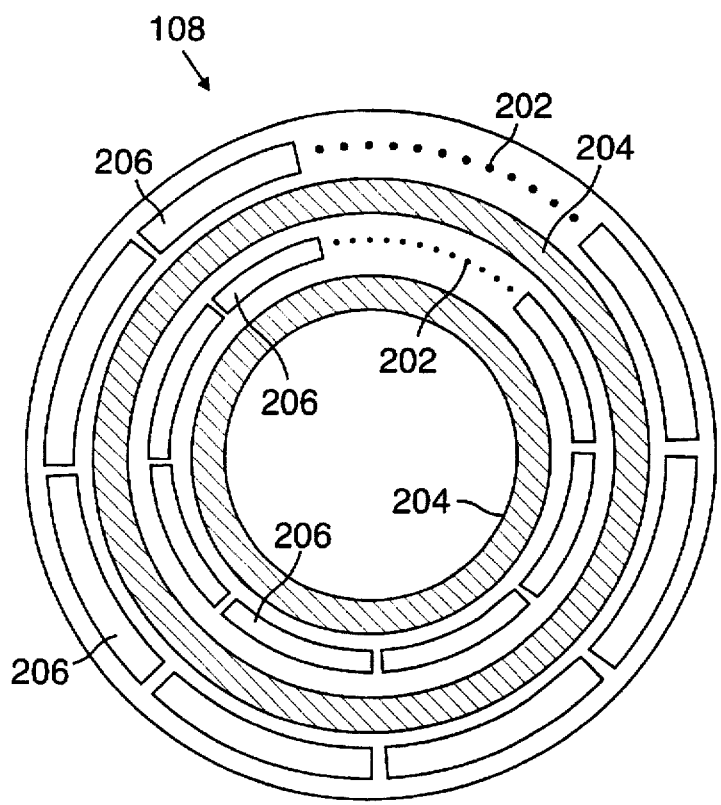
FIG. 2 illustrates a schematic diagram of an exemplary layout of continuous and non-continuous data on a disk.

The data associated with client requests for the retrieval of either continuous or non-continuous media data streams are stored on the RAM disks 108. A typical disk layout is illustrated in FIG. 2. The disk 108 is suitably comprised of a series of rings or tracks 202. Adjacent tracks 202 are separated by gaps 204. For servicing a request, data is typically transferred from a disk in blocks 206. The size of a block may not be equal to the size of the tracks 202.

Referring again to FIG. 1, the server 102 suitably includes a disk reading system 300 for retrieving data from the disks 108 in accordance with the present invention. The disk 108 is inserted into a disk drive 302 of the system 300. The disk drive 302 comprises a movable disk arm 304 and a shaft 306 which rotates the disk. Electronic signal transmission line 309 provides to the processor 104 an output of binary data which has been read or retrieved from the disks 108. To retrieve the data required for servicing a request, the disk 108 is rotated and a disk head 308 which is attached to the shaft 306 is positioned over the particular track containing the data to be retrieved. The movable arm 304 directs the head 308 to the appropriate track.

The processor 104 in the server 102 executes algorithms encoded in software and stored in the memory 106, as conventional in the art, which provide for servicing requests according to a data retrieval schedule. Requests which are serviced by the server 102 are generally referred to as admitted requests. The determination of how many requests can be admitted for servicing according to the available buffer space and disk bandwidth in a server is referred to generally as disk scheduling.

A request $R_i$ by a client for continuous media data can be admitted if the data for servicing the request can be retrieved from the disks 108 into the buffer 107 of the server 102, such that the client making the request can consume data, in other words, read data from the buffer 107, at a transfer rate $r_i$. The response time for a request $R_i$ is the difference between the time, $b_i$, when the requested stream is made available for transfer to the client and the time, $a_i$, when the request arrives at the server 102. The rate at which information is transmitted from the server 102 to the network 146 and, ultimately, to the clients $142_{1,2...x}$, however, cannot exceed the bandwidth of the transmission line 144.

For ease of reference in explaining disk scheduling according to the present invention, each continuous media data request $R_i$ that is admitted may be viewed as a sequence of instances, each of which retrieves some number of consecutive bits of the corresponding clip, or requested real-time data file, such as a movie, from disk to the space in the buffer 107 allocated for storing data which is made available for servicing the admitted requests. An instance starts, or is initiated, at the time when the amount of data to be retrieved is determined, and completes when all the data to be retrieved is in the buffer. As more fully discussed below, the admitted requests are ordered by the processor 104 in a service list and then stored in that service list order in a portion of the memory 106 called the service list memory 106A. The instances for the different requests are initiated in the order of their appearance in the service list, such that once an instance for a request in the list is initiated and completed, the next instance to be initiated is the one associated with the next request in the list at that time. The sequence in which at most one instance per request in the service list is executed is referred to as a service cycle. A service cycle starts when an instance of the first request in the service list is initiated and ends once the initiated instance of the last request in the list completes. It is assumed that the data retrieved for an instance is available for consumption only when the instance completes, and instances of a request complete in the order initiated by the processor 104. Further, the amount of data retrieved by all instances of a request is equal to the size of the corresponding clip. For a request $R_i$, the number of unconsumed bits in the buffer at time t is denoted by in_buffer$_i$(t), and $s_j$ and $c_j$ denote the time when the $j^{th}$ instance is initiated and completed, respectively. Furthermore, retrieve$_i$(j) denotes the amount of data retrieved by the $j^{th}$ instance of a request $R_i$.

For servicing continuous media requests, disk scheduling must ensure that sufficient data are made available for transfer in order to satisfy the consumption rate of each admitted request $R_i$. A client can issue a data transfer or read request of arbitrary size to the server at arbitrary times. If the requested data exceeds the amount available in the buffer, the number of bits currently available in the buffer are transferred to the client. The read request is completely serviced when all of the requested data is transferred to the client. A continuous media or real-time request is said to starve if, for any a consecutive bits, after the client consumes the a bits at time t, the next consecutive bits are not in the buffer and made available for transfer to a client at time $t+a/r_i$.

It is well known that if the number of instances for each request is greater than one, then data retrieval for more than one real-time request may suitably be interleaved, thereby reducing the response times of requests and conserving buffer space. As described in "Method of Retrieving Continuous and Non-Continuous Media Data From a File System," Ser. No. 08/341,827, filed Nov. 18, 1994, incorporated by reference herein, a common retrieval time period, T, may be utilized for servicing a plurality of real-time requests, such that the difference between the start times of any two real-time consecutive instances of an admitted request is at most equal to the common period.

The lower bound of the common period T is determined by the time required for the disk head to position itself over a track containing the data to be retrieved after an instance is completed, known as the disk latency. For a common retrieval period T, the worst-case completion time for the $j^{th}$ instance of a request $R_i$ is defined as $s_j + \max_k\{c_k - s_k\}$, where $\max_k\{c_k - s_k\}$ is the maximum duration of an instance of a request $R_i$. In the worst case, the time for retrieving data for an instance of a request $R_i$ is equal to the worst case or maximum disk latency, $t_{eat}$ plus the time for transferring di bits from disk, or:

$$\max_j \{c_j - s_j\} = \frac{d_i}{r_{disk}} + t_{lat}. \qquad [1]$$

The disk latency $t_{lat}$ includes the time, $t_{seek}$ for positioning the head on the particular track containing the data, and the rotational latency, $t_{rot}$, or the time associated with rotating the disk to provide that the disk head which reads data from the disk is positioned directly above the track where the first bit of the datastream to be retrieved is located.

The buffer space, $B_i$, which must be allocated for each request $R_i$ serviced in a common period is expressed as:

$$B_i = \left( T + \max_j \{c_j - s_j\} \right) \cdot r_i + d - 1, \qquad [2]$$

where d is equal to the smallest unit of retrieval from disk. The amount of data $d_i$ that each instance retrieves depends on the consumption rate for the request, but is limited such that:

$$d_i = \left\lceil \frac{T \cdot r_i}{d} \right\rceil \cdot d. \qquad [3]$$

The number of bits that the $j_{th}$ instance of $R_i$ retrieves is computed as follows:

$$\text{retrieve}_i(j) = \min \left\{ \left\lfloor \frac{\text{empty}_i(s_j)}{d} \right\rfloor \cdot d, d_i, \text{remaining}_i \right\}, \qquad [4]$$

where $\text{empty}_i(S_j)$ is the size of the portion of the buffer that is empty at time $s_j$ and remaining, is the amount of the clip data which is not retrieved from disk at time $s_j$. As a result, once an instance completes, data is retrieved from a disk for servicing the instance for the next request in accordance with equation [4]. The amount of data that any instance retrieves is less than or equal to the amount of empty space available in the buffer, thereby preventing an overflow in the buffer. The data retrieved is available for transfer to the client after the completion of the first instance and, at most, T units of time before the worst case completion time of the second instance.

In accordance with the present invention, all admitted real-time requests are serviced within a common period, where the length of common period T is selected to maximize the most common rate for concurrently servicing requests. For all of the disk scheduling techniques of the present invention discussed below, servicing of requests in a service list is re-commenced immediately after all instances for the requests have been completed. As more fully discussed below, disk scheduling is performed for a selected value of T which maintains the total buffer requirement for real-time requests less than or equal to the available buffer space and the total of disk retrieval times less than or equal to the common period T. Thus, the length of a service cycle can vary, but is bounded above by the common period T to provide for lowering response times and reducing the buffering requirements for each request.

For the disk scheduling techniques initially described, it is assumed that real-time data, such as movie data, is stored contiguously on disks. This assumption is subsequently relaxed for describing alternative aspects of the present invention. Further, for purposes of clarity and simplicity, at this point, the physical layout of a disk is ignored and the smallest value for $r_{disk}$ is utilized in explaining the disk scheduling techniques of the present invention.

Figure 3:
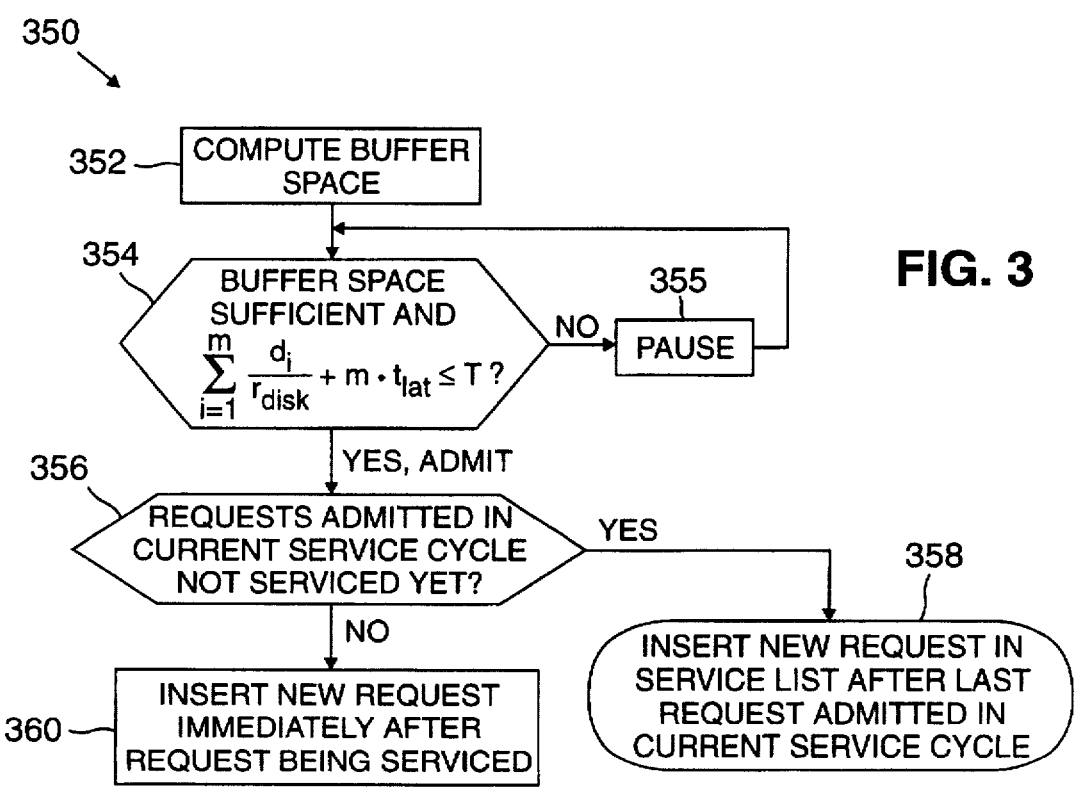
FIG. 3 is a flow chart of a method for retrieving data from a disk for servicing a newly admitted continuous media request in a current service cycle before servicing requests admitted in a previous service cycle.

FIG. 3 illustrates a disk scheduling process 350, hereinafter referred to as early response (ER), for servicing newly admitted continuous media requests within a common period T in accordance with the present invention. In ER, the processor 104 continuously re-orders the admitted continuous media requests which are contained in a service list in the service list memory 106A to provide that the response time for a newly admitted request $R_m$ depends on the instance duration of only those requests which were admitted in the current service cycle before $R_m$ was admitted. As more fully discussed below, the new request $R_m$ is serviced immediately after all other new requests admitted previously in the current service cycle are serviced and before requests which were admitted in a previous service cycle are serviced. The service list is re-ordered for the purpose of including newly admitted requests as long as all admitted requests can be serviced within time T of being serviced in the previous service cycle.

Referring to FIG. 3, when a new request $R_m$ arrives at the server 102, the processor 104 performs the steps of the process 350 for determining whether the request may be admitted and, if admitted, where in the service list to place the request. In step 352, the processor 104 computes the amount of space which must be available in the buffer for servicing each request $R_i$ included in the service list using the expression:

$$B_i = \left( T + \frac{d_i}{r_{disk}} + t_{lat} \right) \cdot r_i + d - 1.$$

In step 354, the processor 104 determines whether sufficient space exists in the buffer for servicing the new request, and whether the duration of a service cycle, where the request $R_m$ is included in a service list that contains the requests $R_1, \ldots, R_{m-1}$, is less than or equal to T, according to the equation:

$$\sum_{i=1}^{m} \frac{d_i}{r_{disk}} + m \cdot t_{lat} \leq T. \qquad [5]$$

If both conditions in step 354 are satisfied, the processor 104 proceeds to step 356. If not, in step 355, the processor 104 pauses for a user set interval before repeating step 354. In other words, the new request is not admitted until sufficient space becomes available in the buffer.

In step 356, the processor 104 determines whether a request admitted during the current service cycle has not been serviced before $R_m$ arrived. If it has not, in step 358, the processor 104 suitably modifies the contents of the service list memory 106A such that $R_m$ is inserted into the service list after the last request admitted in the current service cycle. Otherwise, in step 360, the processor 104 inserts $R_m$ in the service list immediately after the request currently being serviced.

ER disk scheduling further provides that once the last instance of a request $R_i$ completes in a service cycle, $R_i$ is deleted from the service list in the next service cycle only after instances of requests before $R_i$ in the list have been completed. Delaying the deletion of $R_i$ until the next service cycle in conjunction with equation [5] and the fact that a subsequent service cycle begins immediately after the previous service cycle ends ensures that servicing new requests earlier in a subsequent service cycle does not cause the difference between the start times of two consecutive instances of a request to exceed T. Data, therefore, is available for transfer to a client after the first instance completes, and requests are guaranteed to be adequately serviced or, as referred to conventionally in the art, requests do not starve. While ER yields a worst case response time of T, the average response time will typically be less than T. It is noted that ER provides for servicing of requests with respect to their time of arrival and does not optimize disk arm movement, such that the length of each instance is computed based on worst-case assumptions.

In another aspect of the present invention, a disk scheduling technique, called C-LOOK, provides for a reduction in the amount of time which must be allocated for the seek time, when multiple requests are serviced within a common period, by optimizing disk arm movement during a service cycle. As more fully discussed below, reducing seek time provides that a larger number of requests can be admitted for servicing within a common period T.

As is well known, a seek is composed of speedup, coast, slowdown and settle times. Very short seeks, which require the disk arm 304 to move radially less than two to four tracks are dominated by the settle time, which is typically 1–3 ms. Long seeks are dominated by the coast time, which is proportional to the seek distance. Each seek may be modeled as a linear function of the distance traveled plus a constant overhead, $t_{settle}$, which consists of factors such as the settle time.

In C-LOOK, disk arm movement is optimized as follows. Requests are ordered in the service list according to the positions on disk to be accessed in order to provide that the disk arm moves in one direction for servicing requests in a service cycle. For purposes of clarity, C-LOOK is explained at this point based on the assumption that continuous media clips are stored contiguously on disk, such that the relative position of two requests in the service list does not change from one service cycle to another.

For C-LOOK disk scheduling, in the course of a service cycle, the disk head travels, in the worst case, a distance that is equal to twice the distance between the outermost and the innermost track. In other words, C-LOOK accounts for two maximum seeks: one $t_{seek}$ pertains to, for all seeks, the part of the seek time due to the linear function of the distance traveled; and, the other $t_{seek}$ is the overhead associated with moving the disk arm 304 from its position after servicing the last request in the service list to the position which will be accessed for servicing the first request in the next service cycle. Hereinafter, the overhead of any m seeks in one direction is simply referred to by $m \cdot t_{settle} + t_{seek}$.

Thus, in C-LOOK, a new request $R_m$ is admitted if:

$$\sum_{i=1}^{m} \frac{d_i}{r_{disk}} + m \cdot (t_{rot} + t_{settle}) + 2 \cdot t_{seek} \leq T. \quad [6]$$

The processor 104 further provides for the deletion of requests from the service list in the service list memory 106A as in ER to ensure that the difference between the start times of two consecutive instances of a request does not exceed T. Compared to ER, C-LOOK reduces the total seek time by at least $m \cdot (t_{seek} - t_{settle}) - 2 \cdot t_{seek}$, yielding significant increases in throughput at the tradeoff of a possible increase in response time. For example, response time may increase because a newly admitted request may be placed, initially, at the end of the service list, whereas in ER a new request is inserted in the service list for immediate servicing.

In a further aspect of the invention, a disk scheduling technique, called first-bit-first (FBF), may be implemented for reducing the time in a common period which must be allocated to the rotational latency component of the disk latency.

FBF requires that continuous media data are stored on a disk, such that each track contains data from no more than one continuous media data clip. If such a clip does not fill an entire track, conventional data files may be stored on the remaining portion of the track, provided the files do not have to be retrieved at a guaranteed rate. If the size of a clip is equal to or greater than the storage capacity of the track, a first portion of the clip occupies a full track and the remainder of the clip is stored on another track.

In FBF, data retrieval for each instance of a request starts immediately when the disk head arrives at the track upon which the string of data to be retrieved is stored, regardless of whether the disk head is at the point on the track where the string of data begins. Data is retrieved as an integral number of tracks during each period except for the last period, where the amount of data retrieved for each request can be different. During the last instance, the remaining data of the clip are retrieved. As a result, rotational latency is not incurred when servicing the request.

FBF may be implemented with ER or C-LOOK by selecting a value for d equal to the track size, or $d = r_{disk} \cdot t_{rot}$. As a result, the worst case service time for each request $R_i$ may be reduced, at a maximum, by the track size at the cost of an increased buffer size. The server 102 admits a new request $R_m$ if the expression:

$$\sum_{i=1}^{m} \frac{d_i}{r_{disk}} + L \leq T, \quad [7]$$

is satisfied, where L is the aggregate seek time which depends on the ordering of the service list. For example, if the list is maintained in ER order, then L is equal to $m \cdot t_{seek}$, and if in C-LOOK order, then L is equal to $m \cdot t_{settle} + 2 \cdot t_{seek}$.

It is noted that if $T \cdot r_i$ is a multiple of the track size, then according to equation [7], the time for servicing request $R_i$ includes only the seek latency and the time to retrieve $T \cdot r_i$ bits. In other words, the time allocated for servicing each request $R_i$ per equation [7] is the time for retrieving $d_i$ bits, where $d_i$ is the smallest number that is a multiple of the track size and greater than or equal to $T \cdot r_i$. On the other hand, if $T \cdot r_i$ is not a multiple of the track size, then the service time for $R_i$ includes the time to retrieve $d_i > T \cdot r_i$ bits. As a result, in certain service cycles, fewer than $d_i$ bits are retrieved for $R_i$. Thus, if $T \cdot r_i$ is only a few bits more than an integral number of tracks, the time that is allocated for $R_i$ will be close to that allocated in a disk scheduling process that does not reduce the rotational delay. This situation may occur because close to $t_{rot}$, transfer time is allocated for the few bytes that cause $T \cdot r_i$ to exceed a multiple of the track size. The disk bandwidth that is allocated for servicing a real-time request but unutilized by that request, therefore, can be used for servicing non-real-time requests, as more fully described below.

In a further aspect of the present invention, a disk scheduling technique called rotational latency elimination (RLE), which is similar to FBF, may be applied in conjunction with ER or C-LOOK for completely eliminating rotational latency in disk scheduling. In RLE, the time allocated for each request $R_i$ consists of only the time for transferring $T \cdot r_i$ bits and the seek time overhead. RLE, thus, provides for the admission of at least as many or more requests than FBF, but at the expense of higher buffer requirements and response times for requests.

Similar to FBF, RLE provides that data retrieval for an instance always involves an integral number of tracks, such that the time allocated for servicing each request $R_i$ consists of only the transfer time for $T \cdot r_i$ bits and the seek time. In RLE, however, the data actually retrieved for an instance of a request is always less than or equal to the data which the instance of the request requires for servicing, known as the data to be retrieved.

The difference between the data actually retrieved and the data to be retrieved for a request $R_i$ is defined as the slack $\delta_i$. If slack exists after a request has been serviced, the amount of data to be actually retrieved during the next instance is increased by the amount of the slack. As a result, additional bits can be read for servicing the request in a subsequent service cycle for purposes of eliminating the slack. The slack, therefore, cannot accumulate indefinitely and is always less than the size of a track. Before data retrieval for a new request commences, consumption of data for a request is delayed until an additional track of data is retrieved into the buffer. Consequently, data missing due to any slack that develops is available for consumption until the slack is attended to in a subsequent instance.

The retrieval of additional bits during an instance, corresponding to the slack for the request, does not cause other requests to starve in that an inadequate amount of data is made available for purposes of servicing. If slack for a request exists, then the service time for the request is reduced by the time required for retrieving the slack from disk. Thus, every service cycle terminates and every request is serviced earlier by the time required for retrieving from disk the sum of all the slacks. Therefore, when a request $R_i$ is serviced for instances subsequent to the first instance, the respective portion in the buffer contains additional bits equal to $r_i$ times the time required to retrieve the sum of all the slacks. For example, if the number of admitted requests is equal to m, in the worst case, the total slack is at most m times the size of a track, tck_size, such that the additional bits which are stored in the buffer for a request $R_i$ are equal to $m \cdot tck\_size \cdot r_i / r_{disk}$ and the size of the buffer required for a request $R_i$ is equal to $T \cdot r_i + tck\_size + m \cdot tck\_size \cdot r_i / r_{disk}$.

Figure 4:
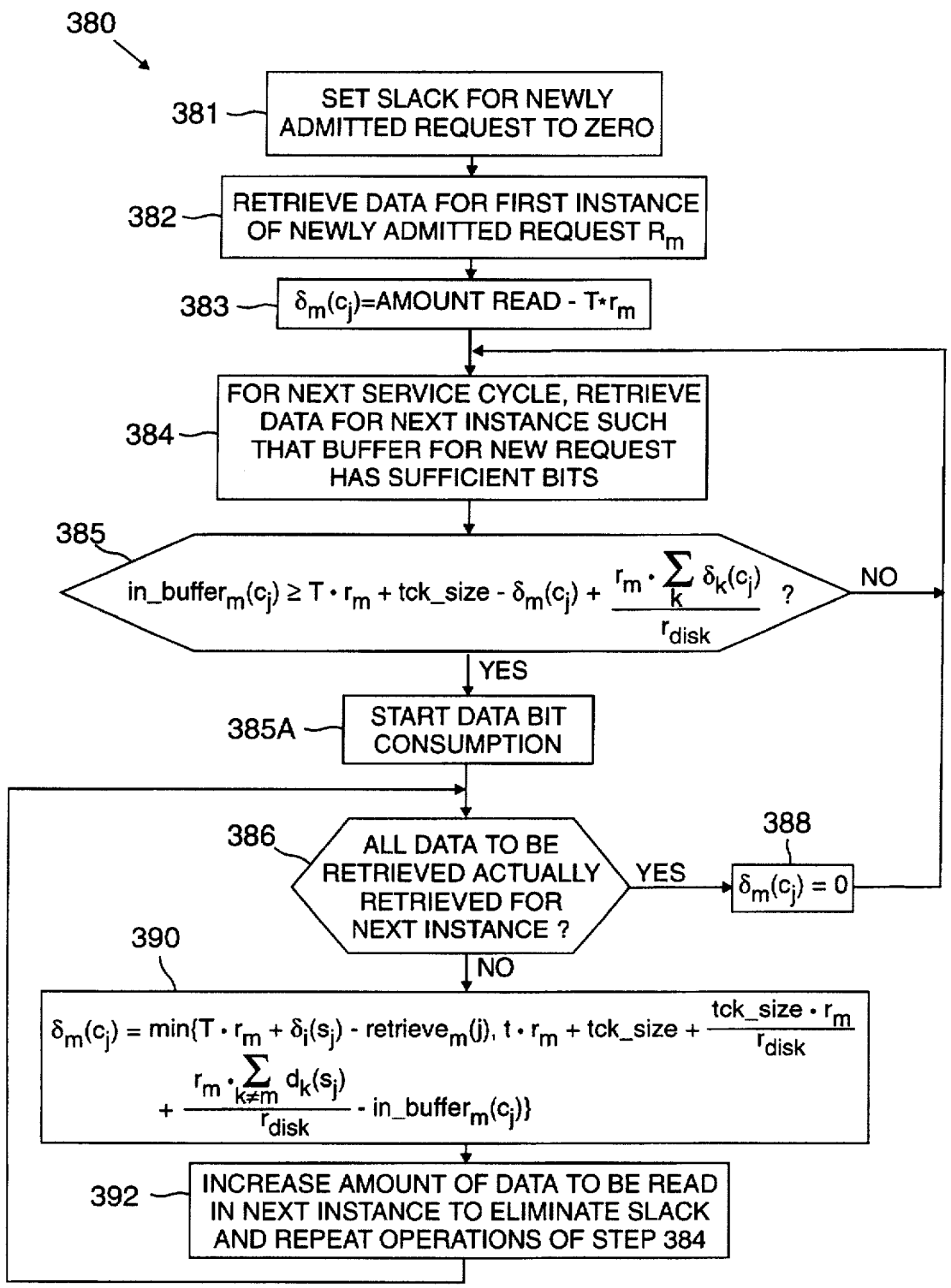
FIG. 4 is a flow chart of a method for retrieving data from a disk in accordance with the present inventive technique which completely eliminates rotational latency as a consideration in disk scheduling.

FIG. 4 shows a process 380 for retrieving data for a new request and attending to the accumulation of slack for that request in accordance with the principles of RLE described above. In general, the server 102 admits a new request $R_m$ for servicing if the equation:

$$\sum_{i=1}^{m} \frac{T \cdot r_i}{r_{disk}} + L \leq T, \quad [8]$$

is satisfied, where L is the aggregate disk latency, excluding rotational latency, incurred in servicing the m requests including the new request $R_m$. The processor 104 can insert new requests into and delete requests from the service list depending upon whether ER is used, in which case L would be set equal to $m \cdot t_{seek}$, or C-LOOK is used, where L would be set equal to $m \cdot t_{settle} + 2 \cdot t_{seek}$.

Referring to FIG. 4, in step 381, the processor 104 sets, using conventional techniques, a slack counter 106B in the memory 106 equal to an initial value of zero before beginning to service the newly admitted request $R_m$, such that $\delta_m(s_i)=0$. Then, in step 382, the processor 104 for the first instance of the newly admitted request $R_m$ retrieves $d_m$ bits of data within a track of $T \cdot r_m$. As explained above, sufficient data must be stored in the buffer before data consumption for the request $R_m$ starts in order to compensate for any slack $\delta_m$ that may develop during servicing and for the retrieval of additional slack bits for other requests during a service cycle. After the first instance for the new request $R_m$ is completed, in step 383, the processor 104 computes the slack $\delta_m(c_j)$ from the difference between $T \cdot r_m$ and the amount read.

In step 384, in the next service cycle, the processor 104 retrieves data for the next instance of $R_m$ to ensure that the respective portion of the buffer 107 contains at least $$T \cdot r_m + tck\_size - \delta_m(c_j) + \frac{r_m \cdot \sum_k \delta_k(c_j)}{r_{disk}}$$

bits, where $$\frac{\sum_k \delta_k(c_j)}{r_{disk}}$$

is the time required for retrieving from disk the cumulative slack for all the admitted requests at time $c_j$. The buffer requirement is satisfied if the maximum number of tracks retrieved for the $j^{th}$ instance satisfies the conditions:

(1) $retrieve_m(j) \leq T \cdot r_m + \delta_m(s_j)$, and (2) $in\_buffer_m(c_j) \leq T \cdot r_m + mck\_size +$ $$\frac{tck\_size \cdot r_m}{r_{disk}} + \frac{r_m \cdot \sum_{k \neq m} \delta_k(s_j)}{r_{disk}}.$$

Condition (1) ensures that the amount of data retrieved for the request $R_m$ is at most $T \cdot r_m + \delta_m(s_j)$. Condition (2) provides that the processor 104 may retrieve a fewer number of bits as long as the buffer space associated with $R_m$ still contains the required number of bits. For example, if there are very few requests in a service cycle, the service cycle is re-commenced immediately before the common period T elapses, such that fewer bits are retrieved for each service cycle. In condition (2), $$\frac{tck\_size \cdot r_m}{r_{disk}}$$

is used instead of $$\frac{\delta_k(c_j) \cdot r_m}{r_{disk}},$$

because the slack at the end of the instance is not known when it starts, but is always less than tck_size. In step 385, the processor 104 determines if, on completion of the $j^{th}$ instance, the size of $in\_buffer_m(c_j)$ is equal to or greater than $$T \cdot r_m + tck\_size - \delta_m(c_j) + \frac{r_m \sum_k \delta_k(c_j)}{r_{disk}}.$$

If yes, in step 385A, the processor 104 permits data consumption by a client to commence. Otherwise, step 384 is executed once again. The additional tck_size bits which are retrieved in step 384 compensate for the slack $\delta_m(c_j)$. Consumption of bits from the buffer by a client is delayed at least until the completion of the second instance to ensure that the request $R_m$ will not starve.

In step 386, the processor 104 determines whether all data to be retrieved in step 384 for the instance of $R_m$ have been actually retrieved. If yes, in step 388, the processor 104 sets the slack $\delta_m(c_j)$ equal to 0, and then proceeds to perform step 384 for continuing the servicing of the request $R_m$. Otherwise, in step 390, the processor 104 sets $\delta_m(c_j)$ equal to:

$$\min \left\{ T \cdot r_m + \delta_m(s_j) - \text{retrieve}_m(j), T \cdot r_m + tck\_size + \frac{tck\_size \cdot r_m}{r_{disk}} + \frac{r_m \cdot \sum_{k \ne m} \delta_k(s_j)}{r_{disk}} - \text{in\_buffer}_m(c_j) \right\} \quad [9]$$

The first element of the set in the expression [9] ensures that the new slack is always less than or equal to the difference between the amount of data to be retrieved and the amount of data actually retrieved. The second element provides that the slack may be set to a lower value than that defined by the first element in the case where the requirements for in_buffer$_i(c_j)$ are satisfied. After step 390, in step 392, the processor 104 provides for an increase in the amount of data to be read in the next instance of the request. The increase is suitably equal to the amount of the slack and provides that additional bits can be read to eliminate the slack for the request $R_m$. Further, in step 392, the operations described for step 384 are repeated and then step 386 is executed to continue the servicing of the new request $R_m$.

In a further aspect of the present invention, disk scheduling techniques for concurrently servicing non-continuous media data requests with continuous media data requests may be implemented in accordance with the above described disk scheduling techniques, such that non-continuous media requests are serviced at low response times and continuous media requests are serviced at the required transfer rates.

For purposes of illustration, each non-continuous media data or non-real-time request, $N_i$, has an associated retrieval size, $n_i$, which defines the amount of data requested. The response time for $N_i$ is the difference between the arrival time of $N_i$ and the time when the last bit of the requested $n_i$ bits is returned to the client.

In accordance with the present invention, to service real-time and non-real-time requests concurrently, a portion of the disk bandwidth and the buffer space in the server 102 must be reserved for servicing non-real-time requests in order to ensure that real-time requests do not block the servicing of non-real-time requests for too long a time. As a result, only a fraction, $\rho$, of the common period, or $\rho \cdot T$, where $\rho$ is a system parameter between 0 and 1, may be allocated for servicing real-time requests using ER or C-LOOK, as described above. The processor 104 admits a new real-time request $R_m$ if, for the admitted real-time requests $R_1, \ldots, R_{m-1}$ and non-real-time requests $N_i, \ldots, N_q$, the expressions $$\sum_{i=1}^{m} \frac{d_i}{r_{disk}} + L \le \rho \cdot T \quad [10]$$

and $$\sum_{i=1}^{m} \frac{d_i}{r_{disk}} + \sum_{i=1}^{q} \frac{n_i}{r_{disk}} + L \le T \quad [11]$$

are both true. For equation [10], L is equal to $m \cdot t_{lat}$ for ER, $2 \cdot t_{seek} + m \cdot (t_{rot} + t_{settle})$ for C-LOOK and $2 \cdot t_{seek} + m \cdot t_{settle}$ for FBF or RLE with C-LOOK, and dc is replaced by $T \cdot r_i$ for RLE with C-LOOK. For equation [11], L is the aggregate latency overhead of servicing the m+q requests, and is equal to $(m+q) \cdot t_{lat}$ for ER, $2 \cdot t_{seek} + (m+q) \cdot (t_{rot} + t_{settle})$ for C-LOOK, and $2 \cdot t_{seek} + (m+q) \cdot t_{settle} + q \cdot t_{rot}$ for FBF or RLE with C-LOOK. Further, for RLE with C-LOOK, $d_i$ in equation [11] is replaced by $T \cdot r_i$. In an alternative embodiment, non-real-time requests which require more disk time than available in a service cycle may be decomposed into multiple smaller requests that may be characterized as individual non-real-time requests for servicing in accordance with the present inventive disk scheduling techniques.

In addition, the processor 104 admits non-real-time requests only if equation [11] remains satisfied. Allocation of only a portion of the service cycle for real-time requests ensures that a certain amount of time in every service cycle can be used to service non-real-time requests. Equations [10] and [11] provide that non-real-time requests may utilize the disk time in a service cycle that is reserved for real-time requests but unutilized by real-time requests, however, real-time requests may not utilize the disk time in a service cycle that is reserved for non-real-time requests but unutilized by non-real-time requests. The above conditions are established because of the expectation that most real-time requests will last more than one service cycle, and if the time in a service cycle reserved but unused by non-real-time requests is assigned to real-time requests, non-real-time requests may be blocked for more than one service cycle which could result in poor response times. On the other hand, time allocated to non-real-time requests is available after time T. Thus, by permitting non-real-time requests to utilize the time reserved for real-time requests, disk bandwidth may be effectively utilized without degrading response times for both real-time as well as non-real-time requests.

Figure 5:
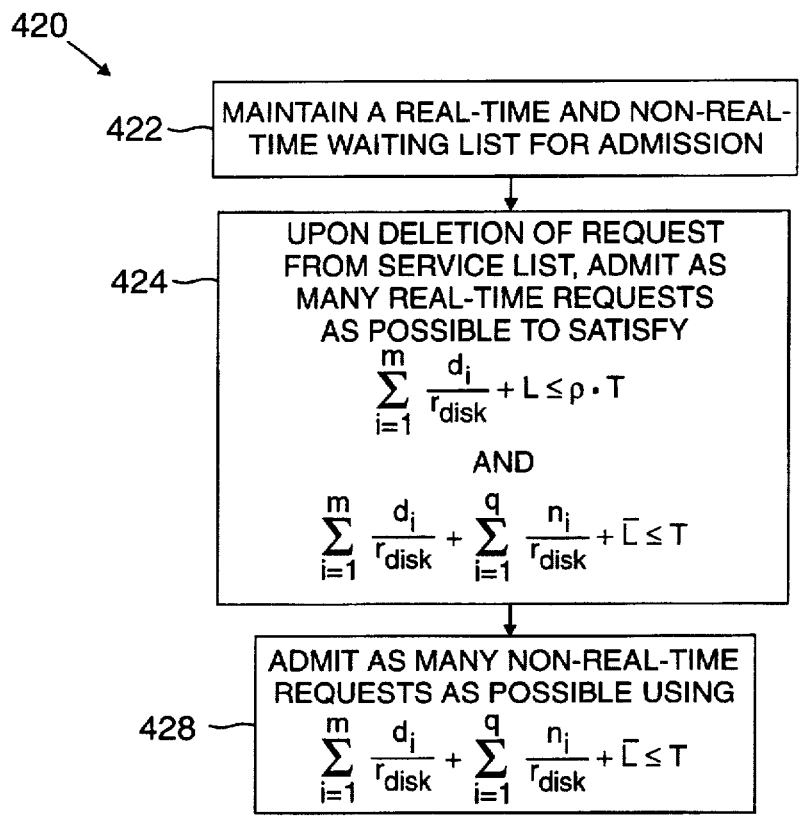
FIG. 5 is a flow chart of a method for retrieving continuous and non-continuous data within a common period in accordance with the present inventive technique.

FIG. 5 illustrates a process 420 for admitting non-real-time and real-time requests to a service list from a waiting list in accordance with C-LOOK or ER. In step 422, the processor 104 places real-time and non-real-time requests which are not admitted upon arrival into first and second waiting lists, respectively, in first-in-first-out (FIFO) order. Similar to the storage of the contents of a service list in the service list memory 106A, the data contents of a waiting list are suitably stored in a portion of the memory 106 known as the waiting list memory 106C. The processor 104 deletes non-real-time requests from the service list similar to real-time requests, treating the former as real-time requests with a single instance. In step 424, a request is deleted from the service list when all instances are completed. When a request is deleted, the processor 104 admits as many real-time requests as possible from the waiting list according to the constraints set forth in equations [10] and [11]. Then, in step 428, the processor 104 admits as many non-real-time requests as possible according to equation [11]. By maintaining waiting lists in FIFO order and not allocating disk bandwidth reserved for real-time requests to non-real-time requests if the waiting list for real-time requests is not empty, fairness in the admission of real-time and non-real-time requests can be ensured. Compliance with equation [11], in particular, ensures that continuous media requests do not starve.

In the above described disk scheduling techniques, it was assumed that the common period T is determined a priori in order to optimize the utilization of buffer space and disk bandwidth for a certain workload. In a dynamic environment, however, the rate requirement for real-time requests may be constantly changing, which could result in under utilization of either buffer space or disk bandwidth. If excess buffer space is available but disk bandwidth is not, increasing the common period increases the buffer space consumed by requests while also increasing the available disk bandwidth. On the other hand, if ample disk bandwidth is available but memory space is scarce, decreasing the common period T increases available memory at the cost of decreasing bandwidth.

In a further aspect of the present invention, the length of the common retrieval period is dynamically varied from one service cycle to another to improve the utilization of disk bandwidth and buffer space. variation of the length of the common period may be implemented in the case where disk transfer rates vary from one track to another. Also, a disk scheduling technique for prematurely accumulating more data in the buffer than that required by the consumption rates, known as pre-fetching, may be implemented for improving response times for both real-time and non-real-time requests.

The length of the common period can be dynamically reduced from T to $\bar{T}$ for servicing real-time and non-real-time requests in accordance with the disk scheduling techniques of ER, C-LOOK, FBF and RLE by replacing T with $\bar{T}$ in equations [10] and [11] only if these equations still remain satisfied for all admitted requests and admitted real-time requests, respectively. In other words, all the data retrieved for requests in the service list must satisfy equations [10] and [11] with the new value $\bar{T}$ inserted as the common period.

In practice, for ER, C-LOOK, FBF and RLE, data is retrieved according to equations [2] and [4], with T in both $B_i$ and $d_i$ replaced by $\bar{T}$. As explained above, equation [11] ensures that the start times of consecutive instances are at most $\bar{T}$ apart. Further, decreasing the common period causes $\max_k\{c_k-s_k\}$ to reduce. Therefore, in_buffer$_i(s_j)$ is equal to or greater than $\max_k\{c_k-s_k\}$ for the $j^{th}$ instance of every real-time request $R_i$ that starts after the common period is changed, such that real-time requests do not starve when the common period is reduced. For example, in RLE, after the common period is reduced, the number of bits consumed from the buffer for $R_i$ between the $j^{th}$ and $(j+1)^{th}$ instances of the request $R_i$ is at most equal to $\bar{T} \cdot r_i + r_i \cdot \Sigma_k\{(\delta_k(c_j)-\delta_k(c_{j+1}))\}/r_{disk}$ and a maximum of $\bar{T} \cdot r_i + \delta_i(s_j)$ bits are retrieved during the $j^{th}$ instance.

Figure 6:
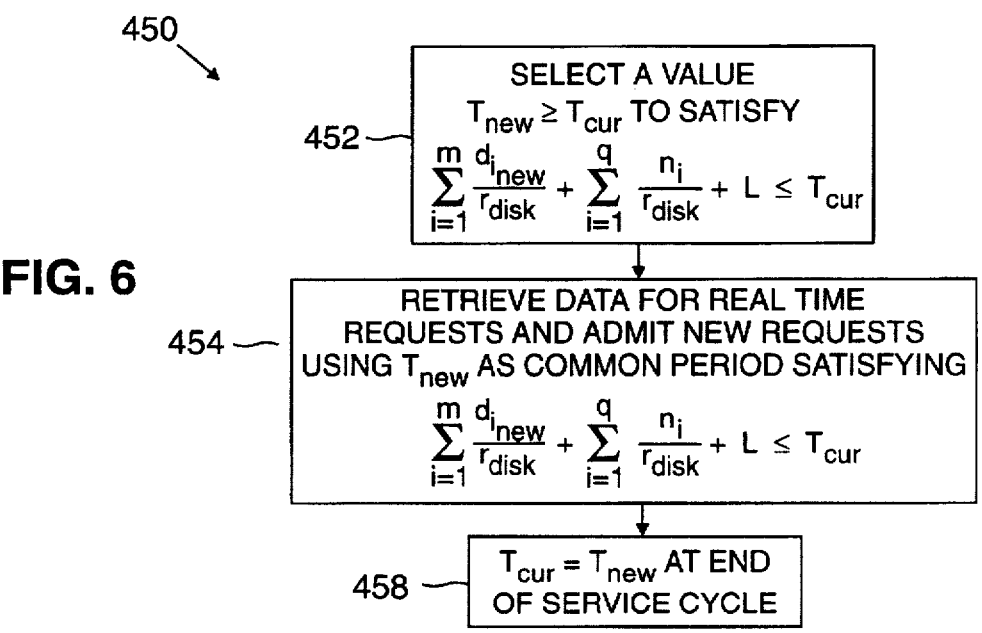
FIG. 6 is a flow chart of a method for increasing the duration of a common period in which data is retrieved for servicing multiple continuous media requests in accordance with the present inventive technique.

FIG. 6 shows a process 450 for dynamically increasing the common period by utilizing unutilized disk bandwidth for reading additional bits when servicing the real-time requests in every service cycle. The common period is increased by a discrete amount in every cycle until $\bar{T}$ is attained, where $\bar{T}>T$. If the current period is defined as $T_{cur}$, $R_1, \ldots, R_m$ is defined as the set of admitted real-time requests and $N_1, \ldots, N_q$ is defined as the set of admitted non-real-time requests, the common period is increased to the maximum value of $T_{new}$ that satisfies the following equation:

$$\sum_{i=1}^{m} \frac{d_{i_{new}}}{r_{disk}} + \sum_{i=1}^{q} \frac{n_i}{r_{disk}} + L \leq T_{cur} \quad [11]$$

where L is as described for equation [11], and $d_{i_{new}}$ is the result of replacing T by $T_{new}$ in the description of $d_i$ for equation [11].

Referring to FIG. 6, the steps of process 450 are performed repeatedly at the beginning of a service cycle until $T_{cur} \geq \bar{T}$ is satisfied, where $T_{cur}$ is initially T. In step 452, the processor 104 selects the maximum value for $T_{new}$ such that the conditions of $T_{new} \geq T_{cur}$ and equation [12] are satisfied. Then, in step 454, the processor 104 retrieves data for real-time requests and admits new requests which satisfy equation [12], where $T_{new}$ is the common period. Then in step 458, at the end of the service cycle, the processor 104 sets $T_{cur}$ equal to $T_{new}$. It is noted that setting $T_{cur}$ equal to $T_{new}$ realizes an unutilized bandwidth of at least $T_{new}-T_{cur}$ in the next service cycle, permitting more requests to be serviced through use of that unutilized bandwidth. Therefore, increasing the common period does not cause any of the real-time requests to starve. As a result, for ER, C-LOOK and FBF, the $j^{th}$ instance of request $R_i$ during a service cycle begins at most $T_{cur}-(d_{i_{new}}-d_i)/r_{disk}$ after $s_{j-1}$. Since the time for retrieving the additional bits from disk is equal to $(d_{i_{new}}-d_i)/r_{disk}$, the data in in_buffer$_m(s_j)$ is greater than or equal to $\max_k\{c_k-s_k\}$, and thus, none of the admitted real-time requests streams starve.

For example, in RLE, the number of bits consumed between the $(j-1)^{th}$ and $j^{th}$ instances for servicing the $j^{th}$ instance of request $R_i$ during a service cycle is at most:

$$T_{cur} \cdot r_i + \frac{r_i \cdot \sum_k \delta_k(c_{j-1}) - \delta_k(c_j)}{r_{disk}},$$

while the number of bits retrieved during the $j^{th}$ instance is at most $T_{new} \cdot r_i + \delta_i(c_{j-1})$. Furthermore, the processor 104 determines $T_{new}$ by distributing the unutilized disk bandwidth, $\Delta$, among the real-time requests in proportion to their rates. Thus, the number of additional bits that can be retrieved for a request $R_i$ is $\Delta \cdot r_i \cdot r_{disk}/(r_1+r_2 \ldots +r_m)$, and thus, $T_{new}$ can be set to $T_{cur}+\Delta \cdot r_i \cdot r_{disk}/(r_1+r_2 \ldots +r_m)$.

Figure 7:
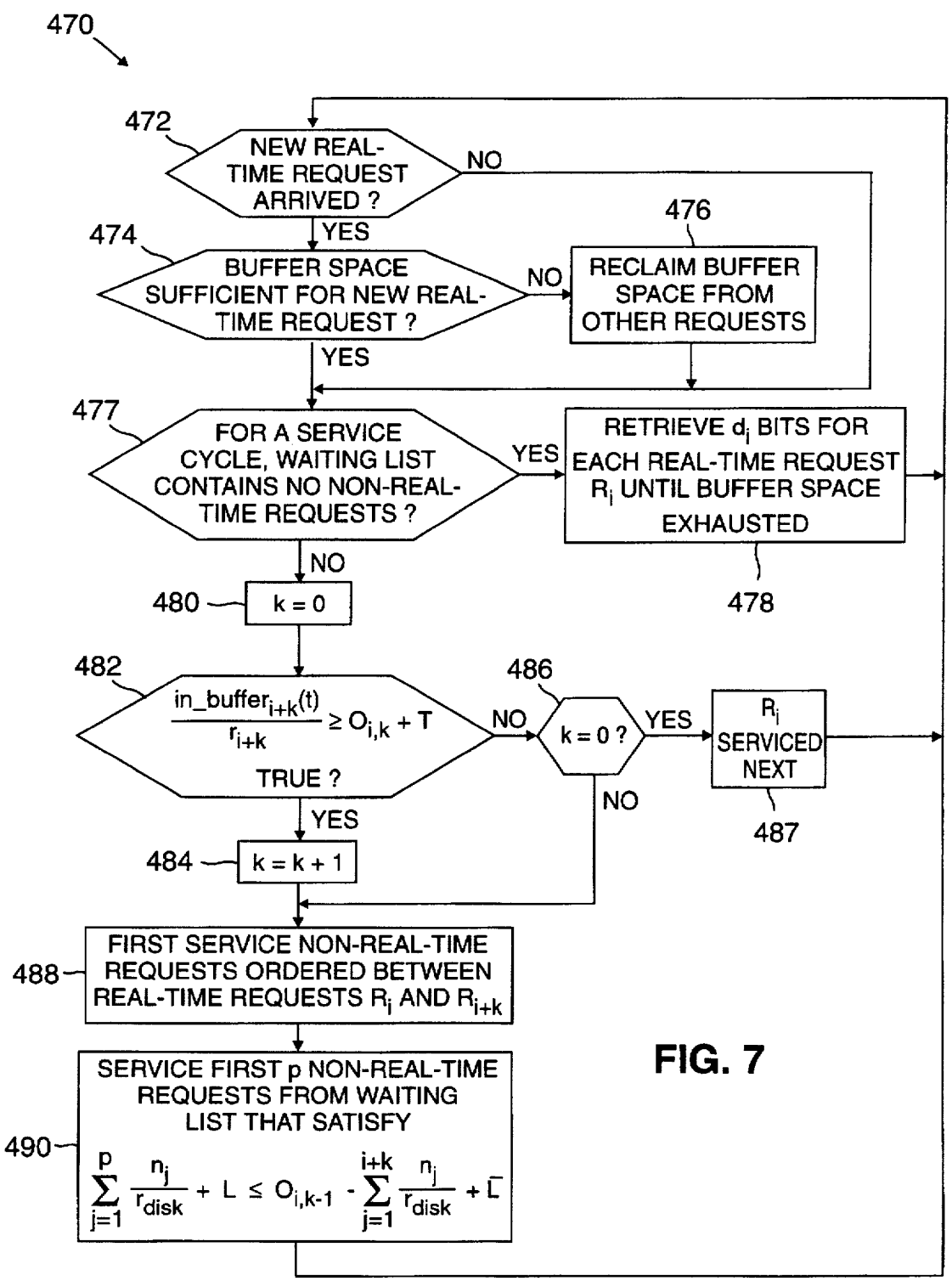
FIG. 7 is a flow chart of a method for retrieving the maximum amount of data possible associated with servicing a continuous media request in accordance with the present inventive technique.

FIG. 7 illustrates a pre-fetching process 470 for retrieving the maximum possible number of bits for a real-time request in a service list as long as buffer space is available in order to decrease the response time of requests. The buffer space allocated to a request $R_i$ is increased by additional bits, such that the need for servicing $R_i$ during a subsequent service cycle is eliminated. The unused bandwidth, in turn, is used for servicing non-real-time requests. It is to be understood that prefetching may be implemented in conjunction with ER or C-LOOK.

Referring to FIG. 7, in step 472, the processor 104 awaits the arrival of a new real-time request for a predetermined time interval. If a request is not received within the interval, step 477 is executed. If received, in step 474, the processor 104 determines if sufficient buffer space is available for servicing this new real-time request. If yes, step 477 is executed. Otherwise in step 476, the processor 104 reclaims buffer space from those requests whose use of buffer space increased as a result of retrieving additional bits, as explained below. For example, additional buffer space greater than $B_i$, as per equation [3], may be reclaimed when using the disk scheduling techniques of ER, C-LOOK and FBF. It is noted that data contained in the reclaimed buffer space needs to be retrieved once again from disk. Step 477 is executed after step 476.

In step 477, the processor 104 determines whether non-real-time requests are not included in a waiting list for admission to the service list. If yes, in step 478, the processor 104 retrieves $d_1$ bits for each real-time request $R_i$. Step 472 is then executed after step 478. It is noted that step 477 can only be performed once a service cycle. As such, repetitive iterations of steps 477 and 478 consecutively cause the buffer space allocated to real-time requests to grow to the greatest extent: possible, assuming non-real-time requests do not arrive in the interim.

When a new non-real-time request is already on the waiting list or arrives at time t and is placed into the waiting list, the processor 104 commences execution of steps 480 through 490 for determining the sequence of k real-time requests which need to be serviced during the next service cycle, but will have sufficient data stored in the buffer at the end of their service times in the next service cycle such that data does not have to be retrieved from disk during the current service cycle. By way of example, $R_i$ is the next real-time request to be serviced when the new non-real-time request arrives at time t.

Referring again to FIG. 7, in step 480, the processor 104 initially sets the value of a variable k in a request counter 106D in the memory 106 equal to 0. Then in step 482, the processor 104 determines whether the $k^{th}$ real-time request $R_{i+k}$ following $R_i$ in the service list satisfies the following condition:

$$\frac{\text{in\_buffer}_{i+k}(t)}{r_{k+k}} \geq O_{i,k} + T, \quad [13]$$

where $O_{i,k}$ is defined as the sum of the worst case retrieval times for both real-time and non-real-time requests starting from the real-time request $R_i$ and extending to and including $R_{i+k}$. For a service list which is maintained in ER order, $O_{i,k}$ is defined as:

$$\sum_{j=1}^{i+k} \frac{d_j}{r_{disk}} + \sum_{j=1}^{l_{i+k}} \frac{n_j}{r_{disk}} + (k + l_{i+k}) \cdot t_{lat},$$

where $N_1 \ldots N_{l_{i+k}}$ are the non-real-time requests between $R_i$ and $R_{i+k}$. For a service list maintained in C-LOOK order, $O_{i,k}$ is defined as:

$$\sum_{j=1}^{i+k} \frac{d_j}{r_{disk}} + \sum_{j=1}^{l_{i+k}} \frac{n_j}{r_{disk}} + (k + l_{i+k}) \cdot (t_{settle} + t_{rot}) + t_1,$$

where $t_1$ is the seek time from request $R_i$ to $R_{i+k}$.

If the condition in step 482 is satisfied for the $k^{th}$ request, then in step 484, the processor 104 increments k by 1. Step 488 is then executed after step 484. Otherwise, in step 486, the processor 104 determines whether k=0. If yes, step 487 is executed, as a non-real-time request cannot be serviced. In step 487, the processor services $R_i$ next and then proceeds to perform step 472. If k≠0 at step 486, step 488 is executed.

If k is greater than zero, as would be the case if equation [13] was satisfied in step 482, then in step 488, the processor 104 first services the non-real-time requests ordered between real-time requests $R_i$ and $R_{i+k}$. Servicing these non-real-time requests will take at most $$\sum_{j=1}^{l_{i+k}} \frac{n_j}{r_{disk}} + \bar{L},$$

where $\bar{L}$ is equal to $l_{i+k} \cdot t_{lat}$ if the service list is maintained in ER order, and $l_{i+k} \cdot (t_{settle}+t_{rot})+t_1$, where $t_1$ is the seek time from $N_1$ to $N_{l_{i+k}}$ if the service list is maintained in C-LOOK order. Then in step 490, the processor 104 services the first p non-real-time requests from the waiting list that satisfy the expression:

$$\sum_{j=1}^{p} \frac{n_j}{r_{disk}} + L \leq O_{i,k-1} - \sum_{j=1}^{l_{i+k}} \frac{n_j}{r_{disk}} + \bar{L}$$

For a service list maintained in ER order, L is set equal to $p \cdot (t_{seek}+t_{rot})$ in the above expression. Alternatively, the processor 104 may order the p requests with respect to their positions on the disk to reduce the seek overhead, in which case L is set equal to $2 \cdot t_{seek}+p \cdot (t_{settle}+t_{rot})$. Step 472 is then executed after step 490.

It is well known that many commonly used disks do not provide for a uniform transfer rate, as the transfer rate for and storage capacity of a track in such disks is proportional to the length of the track. As a result, real-time and non-real-time data may be stored on groups of tracks on a disk, called zones, in accordance with the known physical layout of clips, such that the tracks in each zone contain the same number of bits. Storing data on disk in this manner provides that a more accurate value may be used for representing the transfer rate of a clip's data for purposes of determining the utilization of disk bandwidth and buffer space during data retrieval.

In the disk scheduling techniques described up to this point, the transfer rate of the innermost track, or the minimum transfer rate, has been utilized for $r_{disk}$. A more accurate representation of the transfer rate provides for a more accurate computation of the time required for retrieving data from outer zones for servicing particular requests, such that the above disk scheduling techniques may be implemented to provide for the admission of more requests.

For purposes of illustration, $r_{min_i}$ is defined as the minimum transfer rate for the clip that a request $R_i$ retrieves, in other words, the transfer rate of the innermost zone on which a portion of the clip resides. Therefore, for the descriptions of ER and C-LOOK above, $r_{min_i}$ may replace the transfer rate variable $r_{disk}$ in equations [2], [3] and [4] above because the transfer rate for data requested by $R_i$ is at least $r_{min_i}$.

Optimization of the rotational delay for varying track sizes requires that the size of a unit of retrieval d, which is equal to the track size in ER and C-LOOK, be modified from instance to instance by maintaining the transfer time for a unit of retrieval, such as a track, constant or equal to $t_{rot}$. It is to be understood that this technique may be applied to data retrieval techniques such as ER and C-LOOK.

For purposes of illustration, $d_{min_i}$ and $d_{max_i}$ are defined as the minimum and maximum sizes of units, respectively, retrieved for a request $R_i$, and t is defined as the time required to retrieve a unit. By replacing d with $d_{maxi}$ in equation [2], which is the buffer size for the request $R_i$, and setting $d_i$ to the maximum number of units that $T \cdot r_i$ bits can span according to equation [2], the maximum number of units to be retrieved, $d_i$, is equal to $$\lceil \frac{T \cdot r_i}{d_{min_i}} \rceil$$

units. The number of bits that the $j^{th}$ instance retrieves, therefore, must satisfy the following conditions, instead of those of equation [4]: (1) every instance of a request $R_i$ retrieves zero or more units; (2) retrieve$_i(s_j) \leq$ empty$_i(s_j)$; and, (3) the number of units retrieved is less than or equal to $$\lceil \frac{T \cdot r_i}{d_{min_i}} \rceil.$$

For FBF disk scheduling, since the retrieval unit is a track, $t=t_{rot}$, $d_{min_i}=r_{min_i} \cdot t_{rot}$ and $d_{max_i}=r_{max_i} \cdot t_{rot}$, where $r_{max_i}$ is the transfer rate of the outermost track for the clip that $R_i$ accesses. Thus, since the worst-case service time for the request $R_i$ is $$\lceil \frac{T \cdot r_i}{r_{min_i} \cdot t_{rot}} \rceil \cdot t_{rot} + t_{seek},$$

the buffer size $B_i$ for the request $R_i$ is:

$$B_i = \left( T + \lceil \frac{T \cdot r_i}{r_{min_i} \cdot t_{rot}} \rceil \cdot t_{rot} + t_{seek} \right) \cdot r_i + r_{max_i} \cdot t_{rot} - 1.$$

Data retrieved by each instance satisfies the above three conditions, and a new request $R_m$ is admitted if:

$$\sum_{i=1}^{m} \lceil \frac{T \cdot r_i}{r_{min_i} \cdot t_{rot}} \rceil \cdot t_{rot} + L \leq T$$

is satisfied, where L is the aggregate seek overhead which depends on the ordering of the requests.

Similarly, RLE disk scheduling techniques may be extended for retrieving data over variable track sizes if, in equation [8], $r_{disk}$ is replaced by $r_{min}$. Since the maximum value of the slack can never exceed $r_{max_i} \cdot t_{rot}$, the size of the buffer allocated for request $R_i$ is $$T \cdot r_i + r_{max_i} \cdot t_{rot} + r_i \sum_{k=1}^{m} r_{max_k} \cdot t_{rot}/r_{min_k}.$$

Also, the second condition described above requires, for retrieval of data for the $j^{th}$ instance, that the size of in_buffer$_i(c_j)$ is less than or equal to:

$$T \cdot r_i + r_{max_i} \cdot t_{rot} + \frac{r_{max_i} \cdot t_{rot} \cdot r_i}{r_{min_i}} + r_i \cdot \sum_{k \neq i} \frac{\delta_k(s_j)}{r_{min_k}}.$$

Similarly, the second element in equation [9] is equal to:

$$T \cdot r_i + r_{max_i} \cdot t_{rot} + \frac{r_{max_i} \cdot t_{rot} \cdot r_i}{r_{min_i}} + r_i \cdot \sum_{k \neq i} \frac{\delta_k(s_j)}{r_{min_k}} - \text{in\_buffer}_i(c_j),$$

and consumption of bits is initiated if the size of in_buffer$_i$ ($c_j$) is at least equal to:

$$T \cdot r_i + r_{max_i} \cdot t_{rot} - \delta_i(c_j) + r_i \cdot \sum_{k} \frac{\delta_k(c_j)}{r_{min_k}}.$$

It is also well known that continuous media clips may be stored non-contiguously on disk. Typically, data stored in this manner is represented as a sequence of blocks of size b suitably selected to reduce fragmentation and effectively utilize buffer space. The blocks allocated to a clip, therefore, may not be contiguous, such that the retrieval for an instance of data that spans multiple blocks will result in seeks between consecutive blocks. For purposes of simplicity, an instance of a request during a service cycle is modeled as a sequence of subinstances, each of which accesses only one block on the disk. An instance begins when the amount of data to be retrieved during the instance is determined and completes when all the subinstances complete.

The ER disk scheduling technique described above is readily modifiable for retrieving clips which are stored non-contiguously on disk. Admitted requests are inserted into the service list as described for ER above and the amount of data retrieved for an instance is calculated using equation [4]. The time for retrieving $d_i$ bits for a request $R_i$, however, may be more than $t_{lat}+d_i/r_{disk}$, because the $d_i$ bits to be retrieved may span multiple blocks, requiring multiple seeks, one per block. Therefore, ER must be modified for ordering the subinstances of an instance to provide for disk arm movement in a single direction. Since $d_i$ bits can span at most $[d_i/b]+1$ blocks, the time for servicing a request $R_i$ is, in the worst case, $$\max_{j} \{c_j - s_j\} = 2 \cdot t_{seek} + \left( \lceil \frac{d_i}{b} \rceil + 1 \right) \cdot (t_{settle} + t_{rot}) + \frac{d_i}{r_{disk}},$$

because an initial worst case seek may be required for the disk arm to reach the first block, followed by $$\lceil \frac{d_i}{b} \rceil$$

seeks in a single direction that take $$\lceil \frac{d_i}{b} \rceil \cdot (t_{settle} + t_{rot}) + t_{seek}$$

time. The buffer size for each request $R_i$ is selected using equation [2]. However, a new request $R_m$ is admitted only if the following equation:

$$2 \cdot m \cdot t_{seek} + \sum_{i=1}^{m} \left( \lceil \frac{d_i}{b} \rceil + 1 \right) \cdot (t_{settle} + t_{rot}) + \sum_{i=1}^{m} \frac{d_i}{r_{disk}} \leq T, \quad [15]$$

is satisfied. The equation [15] ensures that the difference between the start times of two consecutive instances is at most equal to the common period T. The modified ER technique, thus, results in a worst-case seek latency to be incurred when servicing every request.

In another embodiment of the present invention, C-LOOK disk scheduling may be modified for retrieving data clips which are stored non-contiguously on a disk. As discussed below, the modified C-LOOK provides that the disk head execute a single sweep over the disk per service cycle to eliminate worst-case seek latency overhead.

Figure 8:
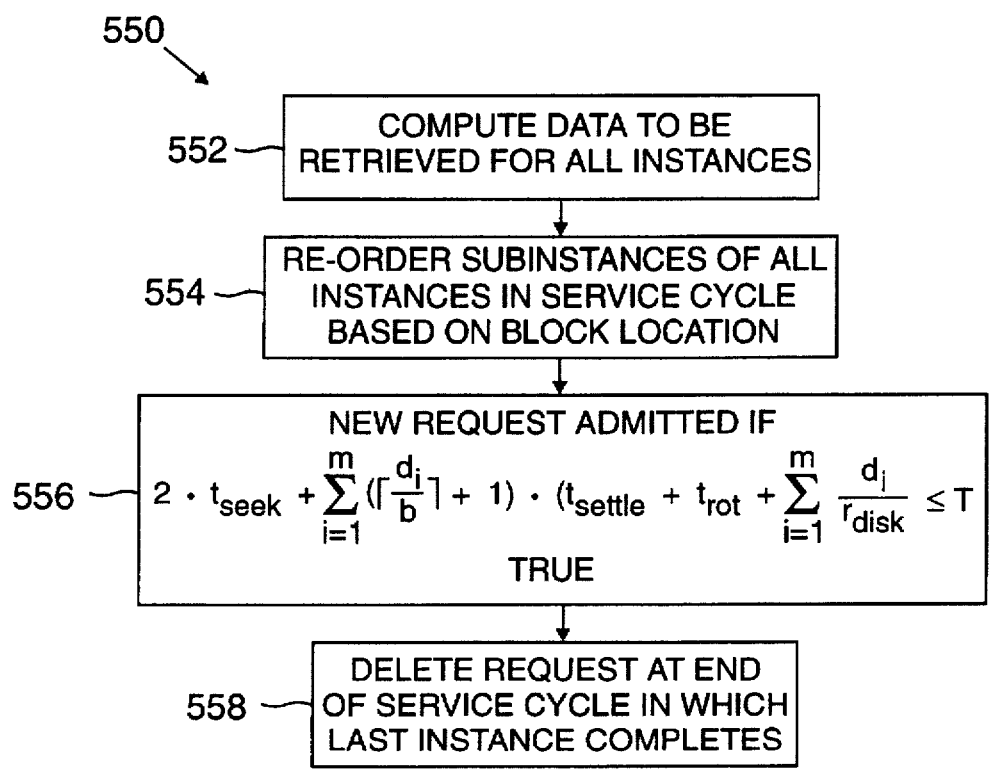
FIG. 8 is a flow chart of a method for retrieving data in accordance with the present inventive technique where continuous media data is stored on a disk non-contiguously.

FIG. 8 shows a process 550 for implementing the modified C-LOOK disk scheduling technique. At the beginning of each service cycle, in step 552, the processor 104 computes using equation [4] the amount of data to be retrieved during the next instance of each admitted request. Thus, an instance begins with the start of its service cycle. In step 554, the processor 104 re-orders the subinstances of all the instances in the service cycle based on the location of the blocks of data to be accessed from disk. This re-ordering reduces the time required for servicing requests in a service cycle by $2 \cdot (m-1) \cdot t_{seek}$, yielding:

$$2 \cdot t_{seek} + \sum_{i=1}^{m} \left( \lceil \frac{d_i}{b} \rceil + 1 \right) \cdot (t_{settle} + t_{rot}) + \sum_{i=1}^{m} \frac{d_i}{r_{disk}}.$$

In step 556, the processor 104 admits a new request $R_m$ from the waiting list only if the following equation:

$$2 \cdot t_{seek} + \sum_{i=1}^{m} \left( \lceil \frac{d_i}{b} \rceil + 1 \right) \cdot (t_{settle} + t_{rot}) + \sum_{i=1}^{m} \frac{d_i}{r_{disk}} \leq T, \quad [16]$$

is satisfied. Equation [16] ensures that the duration of a service cycle is at most equal to the common period T. In step 558, the processor 104 deletes a request $R_i$ from the service list only at the end of the service cycle in which its last instance completes. For a preferred embodiment, data for servicing a request $R_i$ is made available for consumption at the start of the next service cycle after the first instance of $R_i$ completes. It is noted that since $\max_j\{c_j-s_j\}=T$, the buffer size for each request $R_i$ as specified by equation [2], is $2 \cdot T \cdot r_i + d - 1$.

The rotational latency optimization disk scheduling techniques described above, such as FBF and RLE, similarly may be incorporated into the modified ER and C-LOOK disk scheduling techniques for retrieving data clips which are not stored contiguously on a disk, so long as every block is an integral number of tracks. In other words, every track contains data belonging to a single block. For example, if tracks vary in size, then a block size that is a multiple of all the track sizes may be selected. The required buffer sizes and the amount of data retrieved during subinstances are computed as before using equations [2] and [4], except that d is equal to tck_size. Further, equations [15] and [16], which are used for determining whether a request may be admitted in ER and C-LOOK, are modified so as to not include $t_{rot}$, as no rotational latency is incurred.

In particular, in the modified ER disk scheduling technique, where each subinstance of a request is serviced separately, the operation of retrieving data during an instance, and the sizes of buffers for requests and the time after which consumption of bits can begin are the same as described above for RLE, except that new requests are admitted in accordance with the bounds set in equation [8], with L replaced by:

$$2 \cdot m \cdot t_{seek} + \sum_{i=1}^{m} \left( \lceil \frac{T \cdot r_i}{b} \rceil + 1 \right) \cdot t_{settle}.$$

As a result, the worst case where $T \cdot r_i + \text{tck\_size}$ bits may be retrieved for a request $R_i$ during a service cycle is compensated.

In the modified C-LOOK disk scheduling technique, where subinstances for all the requests are ordered at the start of a service cycle based on their locations on disk, buffer space for a request $R_i$ must be allocated to accommodate $$2T \cdot r_i + \text{tck\_size} + \frac{m \cdot \text{tck\_size} \cdot r_i}{r_{disk}}$$

bits in order to implement RLE. Also, for the $j^{th}$ instance of request $R_i$, the maximum number of tracks retrieved must satisfy the expression:

$$\text{retrieve}_i(j) \leq \min \left\{ T \cdot r_i + \delta_i(s_j), 2T \cdot r_i + \text{tck\_size} + \frac{r_i \cdot \text{tck\_size}}{r_{disk}} + \frac{r_i \cdot \sum_{k \neq i} \delta_k(s_j)}{r_{disk}} - \text{in\_buffer}_i(s_j) \right\},$$

where $\delta_i(c_j)$ is set equal to:

$$\min \left\{ T \cdot r_i + \delta_i(s_j) - \text{retrieve}_i(j), 2T \cdot r_i + \text{tck\_size} + \frac{r_i \cdot \text{tck\_size}}{r_{disk}} + \frac{r_i \cdot \sum_{k \neq i} \delta_k(s_j)}{r_{disk}} - \text{in\_buffer}_i(s_j) - \text{retrieve}_i(j) \right\}.$$

Data is consumed from the buffer for a request $R_i$ at $$\frac{\text{tck\_size}}{r_i} + \frac{\sum_k \delta_k(t)}{r_{disk}}$$

time units after t, where t is the completion time of the service cycle in which the first instance completes. In other words, the processor 104 begins consumption at the end of the service cycle when the buffer contains:

$$T \cdot r_i + \text{tck\_size} - \delta_i(t) + \frac{r_i \cdot \sum_k \delta_k(t)}{r_{disk}}$$

bits. Finally, equation [8] is similarly used for determining whether to admit a new request, where L is set equal to:

$$2 \cdot t_{seek} + \sum_{i=1}^{m} \left( \lceil \frac{T \cdot r_i}{b} \rceil + 1 \right) \cdot t_{settle},$$

such that, at time t corresponding to the start of every service cycle, the portion of the buffer associated with $R_i$ contains $$T \cdot r_i + \text{tck\_size} - \delta_i(t) + \frac{r_i \cdot \sum_k \delta_k(t)}{r_{disk}}$$

bits.

In a further aspect of the present invention, the above described disk scheduling techniques may be further modified for servicing non-real-time requests in the circumstance where clips of continuous data are stored non-contiguously on disk. For example, if the modified ER disk scheduling technique is used for servicing requests, the same procedure as described above is performed, except that in performing the computations of equations [11] and [10], L is set equal to $$2 \cdot m \cdot t_{seek} + \sum_{i=1}^{m} \left( \lceil \frac{d_i}{b} \rceil + 1 \right) \cdot (t_{settle} + t_{rot}),$$

and $\overline{L}$ is set equal to $$2 \cdot (m+q) \cdot t_{seek} + \sum_{i=1}^{m} \left( \lceil \frac{d_i}{b} \rceil + 1 \right) \cdot (t_{settle} + t_{rot}) + \sum_{i=1}^{q} \left( \lceil \frac{n_i}{b} \rceil + 1 \right) \cdot (t_{settle} + t_{rot}).$$

Similarly, the modified C-LOOK technique may be implemented in this case, with the values for L and $\overline{L}$ being similar to those for ER, except that $2 \cdot (m+q)$ is replaced by 2.

To implement C-LOOK for this case, the beginning $t_b$ and end $t_e$ times of a service cycle are recorded, such that the actual time spent in servicing requests is accounted for and the idle time $T-(t_b-t_e)$ may be used for servicing non-real-time requests in the waiting list. It is noted that even after utilizing the idle time for servicing non-real-time requests, the duration of a service cycle does not exceed T. For example, as an instance starts at the start of its service cycle, the difference between start times of consecutive instances is at most T. These changes may also be implemented for C-LOOK disk scheduling techniques which include rotational latency optimizations.

Similarly, to implement ER for this case, the size of the buffer space allocated to each client must be increased to $2 \cdot T \cdot r_i + d - 1$. Further, in any service cycle, if a new real-time request is serviced for the first time, the idle time in that service cycle is not utilized because extending the duration of a service cycle to T may cause the start times between consecutive instances to exceed T.

It is to be understood that the embodiments and variations shown and described above are illustrative of the principles of this invention only and that various modifications may implemented by those skilled in the art without departing from the scope and spirit of the invention.

We claim:

1. A method of retrieving data from a disk to a buffer, wherein the disk contains at least one continuous media data file, each continuous media data file being characterized by a transfer rate, the method comprising the steps of:

receiving a plurality of requests for said at least one continuous media data file;

admitting the requests for servicing within a common retrieval time period, such that data are made available for transfer at the respective transfer rates;

establishing a service list for retrieving from the disk the data required for servicing the admitted requests at the respective transfer rates, said service list listing the requests in the order that data is to be retrieved from the disk as part of a service cycle; and, re-commencing the retrieval of data from the disk according to the service list order for servicing admitted requests immediately after the completion of the service cycle.

2. The method of claim 1, wherein said common period is selected to maintain buffer requirements for servicing continuous media requests less than or equal to available buffer space and maintain disk retrieval times less than or equal to the common period.

3. The method of claim 1, wherein the step of establishing the service list further comprises the steps of:

identifying preceding requests, said preceding requests being requests admitted in a current service cycle before a newly arrived request was admitted in the current service cycle;

determining whether any of the preceding requests have been serviced during the current service cycle;

placing the newly admitted request next in the service list for immediate servicing before requests admitted in previous service cycles if all of the preceding requests have been serviced during the current service cycle; and, placing the newly admitted request in the service list for servicing before requests admitted in the previous service cycles which have not been serviced in the current service cycle and after the preceding requests which have not been serviced in the current service cycle at the time that the newly admitted request was received.

4. The method of claim 3, wherein said at least one continuous data file includes clips which are stored contiguously on the disk.

5. The method of claim 3, wherein said at least one continuous data file includes clips which are stored non-contiguously on the disk, and further comprising the step of:

ordering subinstances of an instance of a request to provide that data is retrieved for the service cycle in a single direction across the disk.

6. The method of claim 3, wherein said at least one continuous data file is stored on tracks of the disk, such that data are retrieved from the disk at different rates according to the track on the disk which is accessed, wherein the amount of data retrieved from the disk for an instance is variable and wherein the amount of time required for retrieving the data for the instance is constant.

7. The method of claim 3, further comprising the steps of:

identifying completion of the last instance of a request in the service cycle; and, deleting the completed request from the service list in the next service cycle only after instances of requests before the completed request in the service list have been completed.

8. The method of claim 3, wherein the amount of data retrieved from the disk for an instance is variable and wherein the amount of time required for retrieving the data for the instance is constant.

9. The method of claim 1, wherein the step of establishing the service list further comprises the steps of:

identifying the positions on the disk that contain the data required to be retrieved for servicing the admitted requests; and, ordering the admitted requests in the service list for servicing within the common retrieval period based on the location of tracks on the disk from which the data must be retrieved, such that data retrieval from the disk during the service cycle is in one direction across the disk.

10. The method of claim 9, wherein said at least one continuous data file includes clips which are stored contiguously on the disk.

11. The method of claim 9, wherein said at least one continuous data file includes clips which are stored non-contiguously on the disk.

12. The method of claim 9, wherein said at least one continuous data file is stored on tracks of the disk, such that data is retrieved from the disk at different rates according to the track on the disk which is accessed, wherein the amount of data retrieved from the disk for an instance is variable and wherein the amount of time required for retrieving the data for the instance is constant.

13. The method of claim 9, further comprising the steps of:

scanning the disk from a first end to a second end; and, retrieving the data associated with each request in the service list as the disk is scanned.

14. The method of claim 13, further comprising the step of:

scanning the disk from the second end to the first end.

15. The method of claim 9, wherein the amount of data retrieved from the disk for an instance is variable and wherein the amount of time required for retrieving the data for the instance is constant.

16. The method of claim 1, wherein said at least one continuous media data file is stored on an integral number of tracks on the disk, the method further comprising the step of:

retrieving data from the disk as an integral number of tracks for servicing the admitted requests, wherein data is retrieved from the tracks as soon as a disk head for retrieving data from the disk arrives at the tracks from which data is to be retrieved.

17. The method of claim 16, wherein said at least one continuous data file includes data clips which are stored contiguously on the disk.

18. The method of claim 16, wherein said at least one continuous data file includes data clips which are stored non-contiguously on the disk and every track contains data belonging to a single block of data to be retrieved.

19. The method of claim 16, wherein said at least one continuous data file is stored on tracks of the disk, such that data are retrieved from the disk at different rates according to the track which is accessed, wherein the amount of data retrieved from the disk for an instance is variable and wherein the amount of time required for retrieving the data for the instance is constant.

20. The method of claim 16, wherein the step of establishing the service list further comprises the steps of:
  identifying preceding requests, said preceding requests being requests admitted in a current service cycle before a newly arrived request was admitted in the current service cycle;
  determining whether any of the preceding requests have been serviced during the current service cycle;
  placing the newly admitted request next in the service list for immediate servicing before requests admitted in previous service cycles if all of the preceding requests have been serviced during the current service cycle; and,
  placing the newly admitted request in the service list for servicing before requests admitted in the previous service cycles which have not been serviced in the current service cycle and after the preceding requests which have not been serviced in the current service cycle at the time that the newly admitted request was received.

21. The method of claim 16, wherein the step of establishing the service list further comprises the steps of:
  identifying the positions on disk that contain the data required to be retrieved for servicing the admitted requests; and
  ordering the admitted requests in the service list for servicing within the common retrieval period based on the location of tracks on the disk from which the data must be retrieved, such that data retrieval from the disk during the service cycle is in one direction across the disk.

22. The method of claim 16, wherein the amount of data retrieved during instances of the requests is always less than or equal to and within the track containing the data to be retrieved.

23. The method of claim 22, wherein the step of establishing the service list further comprises the steps of:
  identifying preceding requests, said preceding requests being requests admitted in a current service cycle before a newly arrived request was admitted in the current service cycle;
  determining whether any of the preceding requests have been serviced during the current service cycle;
  placing the newly admitted request next in the service list for immediate servicing before requests admitted in previous service cycles if all of the preceding requests have been serviced during the current service cycle; and,
  placing the newly admitted request in the service list for servicing before requests admitted in the previous service cycles which have not been serviced in the current service cycle and after the preceding requests which have not been serviced in the current service cycle at the time that the newly admitted request was received.

24. The method of claim 22, wherein the step of establishing the service list further comprises the steps of:
  identifying the positions on disk that contain the data required to be retrieved for servicing the admitted requests; and
  ordering the admitted requests in the service list for servicing within the common retrieval period based on the location of tracks on the disk from which the data must be retrieved, such that data retrieval from the disk during the service cycle is in one direction across the disk.

25. The method of claim 24, wherein the step of adjusting the amount of data to be retrieved further comprises the step of:
  incrementing the amount of data to be retrieved for the next instance of the request based on the slack so as to reduce the slack, if any such slack exists, to prevent the request from starving.

26. The method of claim 24, wherein said at least one continuous data file includes clips which are stored contiguously on the disk.

27. The method of claim 24, wherein said at least one continuous data file is stored on tracks of the disk such that data are retrieved from the disk at different rates according to the track which is accessed, wherein the amount of data retrieved from the disk for an instance is variable and wherein the amount of time required for retrieving the data for the instance is constant.

28. The method of claim 16, wherein said at least one continuous data file is stored on tracks of the disk such that data are retrieved from the disk at different rates according to the track which is accessed, wherein the amount of data retrieved from the disk for an instance is variable and wherein the amount of time required for retrieving the data for the instance is constant.

29. A method of retrieving data from a disk to a buffer, wherein the disk contains at least one continuous media data file and the continuous media data files are stored on an integral number of tracks on the disk, each continuous media data file being characterized by a transfer rate, the method comprising the steps of:
  receiving a plurality of requests for said at least one continuous media data file;
  admitting the requests for servicing within a common retrieval time period, such that data is made available for transfer at the respective transfer rates;
  establishing a service list for retrieving from the disk the data required for servicing the admitted requests at the respective transfer rates, said service list listing the requests in the order that data is to be retrieved from the disk as part of a service cycle;
  retrieving data for a request from tracks on the disk containing the data to be retrieved as soon as a disk head for retrieving data from the disk arrives at the track on which the data associated with the request is stored, wherein the amount of data retrieved during instances of the requests is always less than or equal to and within the track containing the data to be retrieved;
  computing the difference between the amount of data to be retrieved and the amount of data actually retrieved for the request as slack;

adjusting the amount of data to be retrieved for the next instance of the request based on the slack; and, re-commencing the retrieval of data from the disk according to the service list order for servicing admitted requests immediately after the completion of the service cycle.

30. A method of retrieving data from a disk, wherein the disk contains at least one continuous media data file and at least one non-continuous media data file, each continuous media data file being characterized by a transfer rate, the method comprising the steps of:

receiving a plurality of requests for said at least one continuous media data files and said at least one non-continuous media data file;

establishing a service list for retrieving from the disk the data required for servicing the admitted continuous media requests at the respective transfer rates and servicing the non-continuous media requests, said service list listing the requests in the order that data is to be retrieved from the disk as part of a service cycle;

establishing continuous media and non-continuous media request waiting lists for the continuous and non-continuous data file requests, respectively, awaiting admission to the service list;

admitting the requests for servicing within a common retrieval time period, wherein only a fraction of the common period is allocated for servicing continuous media data requests; and, re-commencing the retrieval of data from the disk according to the service list order for servicing admitted requests immediately after the completion of the service cycle.

31. The method of claim 30, wherein the portion of the service cycle allocated for continuous media requests may be utilized for servicing non-continuous media requests on the waiting list.

32. The method of claim 30, wherein said at least one continuous data file is stored on tracks of the disk such that data are retrieved from the disk at different rates according to the track which is accessed, wherein the amount of data retrieved from the disk for an instance is variable and wherein the amount of time required for retrieving the data for the instance is constant.

33. The method of claim 30, wherein said at least one continuous data file includes clips which are stored contiguously on the disk.

34. A method of retrieving data from a disk, wherein the disk contains at least one continuous media data file and at least one non-continuous media data file, each continuous media data file being characterized by a transfer rate, the method comprising the steps of:

receiving a plurality of requests for said at least one continuous media data file and said at least one continuous media data file;

admitting the requests for servicing within a dynamically computed common retrieval time period which is varied during servicing of requests, such that continuous media data are made available for transfer at the respective transfer rates;

establishing a service list for retrieving from the disk the data required for servicing the admitted requests, said service list listing the requests in the order that data is to be retrieved from the disk as part of a service cycle; and re-commencing the retrieval of data from the disk for servicing admitted requests according to the service list order immediately after the completion of the service cycle.

35. The method of claim 34, wherein the duration of the common period is decreased during servicing of requests.

36. The method of claim 34, wherein the duration of the common period is increased during servicing of requests.

37. A method of retrieving data from a disk, wherein the disk contains at least one continuous media data file and at least one non-continuous media data file, each continuous media data file being characterized by a transfer rate, the method comprising the steps of:

receiving a plurality of requests for said at least one continuous media data file and said at least one non-continuous media data file;

admitting the requests for servicing within a common retrieval time period, such that data are made available for transfer at the respective transfer rates;

establishing a service list for retrieving from the disk the data required for servicing the admitted requests at the respective transfer rates, said service list listing the requests in the order that data is to be retrieved from the disk as part of a service cycle;

maintaining a buffer for storing the data retrieved from the disk;

retrieving additional bits from the disk for servicing the admitted continuous media requests in successive service cycles to the extent of available space in the buffer, such that unutilized bandwidth for retrieving data from the disk is made available for servicing non-continuous media data requests in subsequent service cycles; and, re-commencing the retrieval of data from the disk according to the service list order for servicing admitted requests immediately after the completion of the service cycle.

38. The method of claim 37, further comprising the steps of:

reclaiming space in the buffer from the continuous media requests whose use of space in the buffer increased, if available space in the buffer is insufficient for servicing a newly arrived continuous media data request.

39. The method of claim 37, further comprising the step of:

identifying the continuous media requests which need to be serviced during the next service cycle but would have sufficient data stored in the buffer at the end of their service times in the next service cycle, such that data does not have to be retrieved from the disk for servicing these requests during the current service cycle.

40. The method of claim 37, wherein said at least one continuous data file is stored on tracks of the disk such that data are retrieved from the disk at different rates according to the track which is accessed, wherein the amount of data retrieved from the disk for an instance is variable and wherein the amount of time required for retrieving the data for the instance is constant.

41. The method of claim 37, wherein said at least one continuous data file includes clips which are stored contiguously on the disk.

42. A system for retrieving data comprising:

a disk containing at least one continuous media data file, each continuous media data file being characterized by a transfer rate;

a buffer connected to the disk for storing portions of said at least one continuous media data file;

a processor connected to the disk and the buffer for receiving a plurality of requests for said at least one continuous media data file;

a service list memory connected to the processor for storing a service list of requests to be serviced, said service list listing requests in the order that data is to be retrieved from the disk as part of a service cycle, and wherein said processor further performs the operations of:

admitting the requests for servicing within a common retrieval time period, such that data are made available for transfer at the respective transfer rates;

establishing the service list for retrieving from the disk the data required for servicing the admitted requests at the respective transfer rates, and re-commencing the retrieval of data from the disk according to the service list order for servicing admitted requests immediately after the completion of the service cycle.

43. The system of claim 42, wherein said processor computes the common period such that space requirements for servicing continuous media requests are maintained less than or equal to available space in the buffer and disk retrieval times are maintained less than or equal to the common period.

44. The system of claim 43, wherein the processor further performs the operations of:

identifying the positions on the disk that contain the data required to be retrieved for servicing the admitted requests; and, ordering the admitted requests in the service list for servicing within the common retrieval period based on the location of tracks on the disk from which the data must be retrieved, such that data retrieval from the disk during the service cycle is in one direction across the disk.

45. The system of claim 43, wherein said at least one continuous media data file is stored on an integral number of tracks on the disk, and wherein the processor further performs the operation of retrieving data from the disk as an integral number of tracks for servicing the admitted requests, wherein the data is retrieved from the tracks as soon as a disk head for retrieving data from the disk arrives at the tracks from which data is to be retrieved.

46. The system of claim 43, wherein said at least one continuous data file includes data clips which are stored contiguously on the disk.

47. The system of claim 43, wherein said at least one continuous data file includes data clips which are stored non-contiguously on the disk and every track contains data belonging to a single block of data to be retrieved.

48. The system of claim 43, wherein said at least one continuous data file is stored on tracks of the disk such that data are retrieved from the disk at different rates according to the track which is accessed, wherein the amount of data retrieved from the disk to the buffer during instances of the requests is always less than or equal to and within the track containing the data to be retrieved.

49. A system for retrieving data comprising:

a disk containing at least one continuous media data file, said at least one continuous media data file being stored on an integral number of tracks on the disk, each continuous media data file being characterized by a transfer rate;

a buffer connected to the disk for storing portions of said at least one continuous media data file;

a processor connected to the disk and the buffer for receiving a plurality of requests for said at least one continuous media data file;

a service list memory connected to the processor for storing a service list of requests to be serviced; and, a slack counter connected to the processor for maintaining a record of slack for requests, and wherein said processor performs the operations of:

admitting the requests for servicing within a common retrieval time period, such that data are made available for transfer at the respective transfer rates;

establishing the service list for retrieving from the disk the data required for servicing the admitted requests at the respective transfer rates, said service list listing the requests in the order that data is to be retrieved from the disk as part of a service cycle;

retrieving data for a request from tracks on the disk containing the data to be retrieved as soon as a disk head for retrieving data from the disk arrives at the track on which the data associated with the request is stored, wherein the amount of data retrieved during instances of the requests is always less than or equal to and within the track containing the data to be retrieved;

computing the difference between the amount of data to be retrieved and the amount of data actually retrieved for the request as the slack;

storing data representative of the value of the slack in the slack counter;

adjusting the amount of data to be retrieved for the next instance of the request based on the slack; and, re-commencing the retrieval of data from the disk according to the service list order for servicing admitted requests immediately after the completion of the service cycle.

50. A system for retrieving data comprising:

a disk, said disk containing at least one continuous media data file and at least one non-continuous media data file, each continuous media data file being characterized by a transfer rate;

a buffer connected to the disk for storing portions of the at least one continuous and non-continuous media data file;

a processor connected to the disk and the buffer for receiving a plurality of requests for said at least one continuous media data files and said at least one non-continuous media data file;

a service list memory connected to the processor for storing a service list of requests to be serviced; and, a waiting list memory connected to the processor, and wherein the processor further performs the operations of:

establishing the service list for retrieving from the disk the data required for servicing the admitted continuous media data requests at the respective transfer rates and servicing the non-continuous media requests, said service list listing the requests in the order that data is to be retrieved from the disk as part of a service cycle;

establishing continuous media and non-continuous media request waiting lists in the waiting list memory for the continuous and non-continuous data file requests, respectively, awaiting admission to the service list;

admitting the requests for servicing within a common retrieval time period, wherein only a fraction of the common period is allocated for servicing continuous media data requests; and, re-commencing the retrieval of data from the disk according to the service list order for servicing admitted requests immediately after the completion of the service cycle.

51. The system of claim 50, wherein the portion of the service cycle allocated for continuous media requests may be utilized for servicing non-continuous media requests on the waiting list.

52. A system for retrieving data comprising:
- a disk containing at least one continuous media data file and at least one non-continuous media data file, said at least one continuous media data file being stored on an integral number of tracks on the disk, each continuous media data file being characterized by a transfer rate;
- a buffer connected to the disk for storing portions of the continuous media data file;
- a processor connected to the disk and the buffer for receiving a plurality of requests for said at least one continuous media data file and said at least one continuous media data file; and
- a service list memory for storing a service list of requests to be serviced, and, wherein said processor performs the operations of:
- admitting the requests for servicing within a dynamically computed common retrieval time period, such that continuous media data are made available for transfer at the respective transfer rates;
- establishing the service list for retrieving from the disk the data required for servicing the admitted requests, said service list listing the requests in the order that data is to be retrieved from the disk as part of a service cycle; and,
- re-commencing the retrieval of data from the disk for servicing admitted requests according to the service list order immediately after the completion of the service cycle.

* * * * *